(12) United States Patent
Sasaki

(10) Patent No.: US 7,848,183 B2
(45) Date of Patent: Dec. 7, 2010

(54) INFORMATION PROCESSING DEVICE AND METHOD, AND RECORDING MEDIUM FOR REDUCING REPLICATION TIME BETWEEN A SOURCE AND A DESTINATION

(75) Inventor: Yukiko Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 923 days.

(21) Appl. No.: 11/729,060

(22) Filed: Mar. 28, 2007

(65) Prior Publication Data

US 2007/0286049 A1    Dec. 13, 2007

(30) Foreign Application Priority Data

Mar. 30, 2006    (JP)    ............... 2006-095972

(51) Int. Cl.
*G11B 21/08*    (2006.01)
(52) U.S. Cl. .............. 369/30.05; 369/47.12; 369/84
(58) Field of Classification Search ............... None
See application file for complete search history.

(56) References Cited

U.S. PATENT DOCUMENTS 7,639,585 B2 *    12/2009    Furuyama ............... 369/84

2002/0018421 A1 *    2/2002    Ichikawa et al. ............ 369/53.36
2005/0099904 A1 *    5/2005    Shin .......................... 369/47.14

FOREIGN PATENT DOCUMENTS

| JP | 6 309116 | 11/1994 |
| JP | 11 039778 | 2/1999 |

* cited by examiner

*Primary Examiner*—Paul Huber
(74) *Attorney, Agent, or Firm*—Frommer Lawrence & Haug LLP; William S. Frommer; Paul A. Levy

(57) ABSTRACT

An information processing device performing replication of data between recording media so that valid information recorded in a first recording medium is recorded in a second recording medium, the information processing device includes a replication control unit controlling the replication of the data so that only information of an allocation space which is an area having the valid information recorded therein is read from the first recording medium serving as a replication source and the read valid information is written in the second recording medium serving as a replication destination.

19 Claims, 14 Drawing Sheets

FIG. 8

| LENGTH | LEADING ADDRESS |
|--------|-----------------|
| 4 | 001A25 |
| 3 | 001A2A |

171

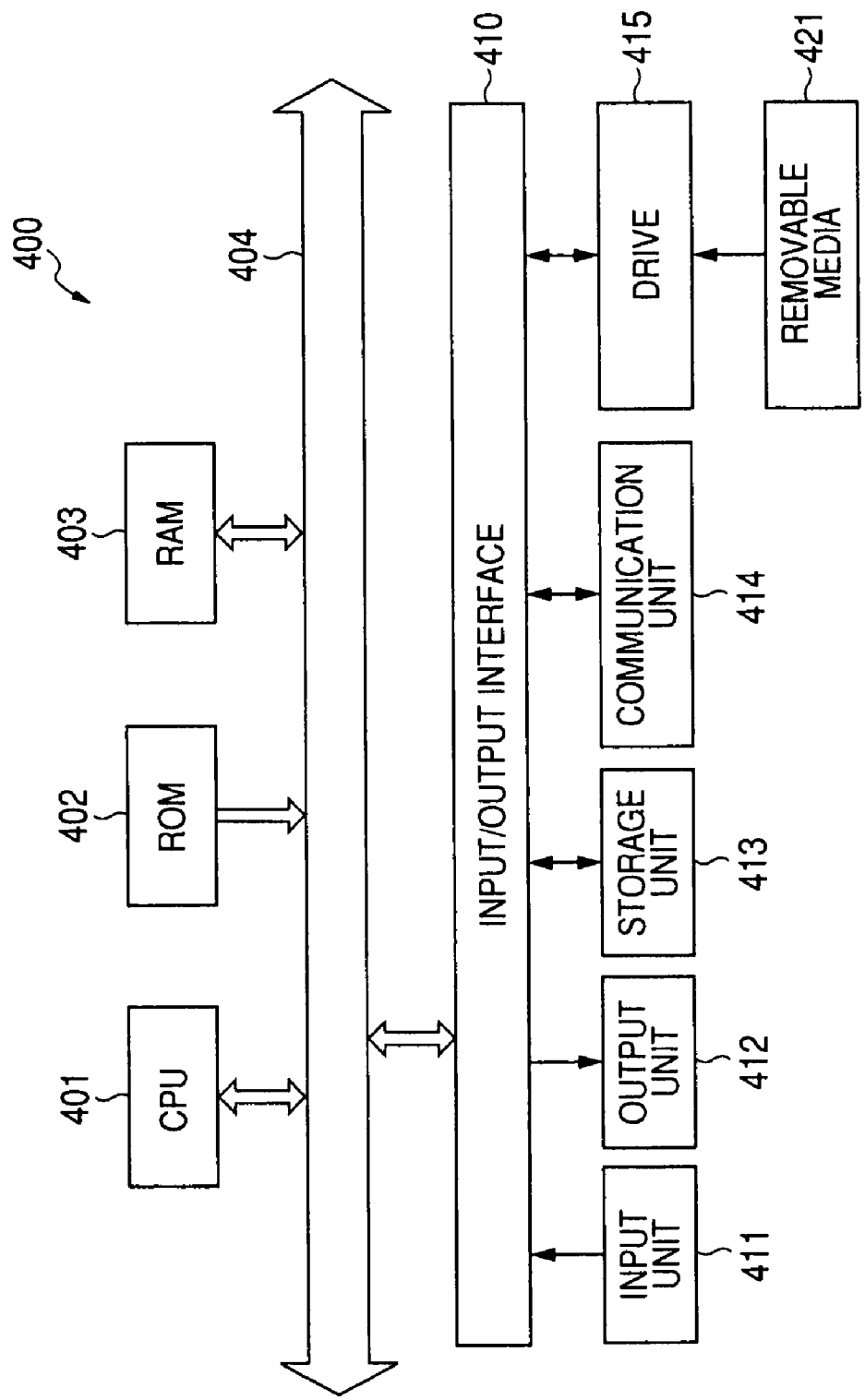

INFORMATION PROCESSING DEVICE AND METHOD, AND RECORDING MEDIUM FOR REDUCING REPLICATION TIME BETWEEN A SOURCE AND A DESTINATION

CROSS REFERENCES TO RELATED APPLICATIONS

The present invention contains subject matter related to Japanese Patent Application JP 2006-095972 filed in the Japanese Patent Office on Mar. 30, 2006, the entire contents of which being incorporated herein by reference.

BACKGROUND OF THE INVENTION

1. Field of the Invention

The present invention relates to a device and a method for information processing, a program, and a recording medium, and particularly, to a device and a method for information processing, a program, and a recording medium which make it possible to reduce a time required for data replication by decreasing unnecessary reading or writing of data.

2. Description of Related Art

In the related art, for example, data replication between recording media included a method of reading only valid data from a recording medium serving as a replication source and writing the valid data in a recording medium serving as a replication destination and a method of reading the entire recording area of the recording medium serving as the replication source as the image data and writing the read image data in the recording medium serving as the replication destination.

In the method of reading the only valid data from the recording medium serving as the replication source and writing the valid data in the recording medium serving as the replication destination, the data is sorted at the time of replicating the data so that a seek time is reduced at the time of reproducing the replicated data from the recording medium serving as the replication destination. For example, the method is disclosed in JP-A-11-39778.

In the method of reading the entire recording area of the recording medium serving as the replication source as the image data and writing the image data in the recording medium serving as the replication destination, the same unit data successively stored in a data part of a physical record at the time of formatting a disc is input as skip data SD, the data is read from a master disc through a disc device, it is judged whether or not the data part of the physical record is filled with the skip data SD at the time of comparing the data with the skip data SD, an identification code ID of the physical record is stored in a semiconductor storage device at the time of judging that the data part of the physical record is filled with the skip data SD, and only data of a physical record other than the physical record corresponding to the identification code ID is replicated at the time of replicating the data of the master disc into a replication disc through the disc device, thereby saving a dead time of the replication. For example, the replication method is disclosed in JP-A-6-309116.

SUMMARY OF THE INVENTION

However, in a method of reading only valid data from a recording medium serving as a replication source and writing the read valid data in a recording medium serving as a replication destination, it may be necessary to perform a process such as calculation of an address or update of the valid data with data sorting at the time of writing the read valid data in a recording area of the replication destination, thereby incrementing a processing time or a load.

In a method disclosed in JP-A-11-39778, it may be expected that a seek time is reduced at the time of performing a reproducing operation, but it may not be expected that a time required for data replication is reduced. The time required for data replication or the load may be incremented by arithmetic processing for data rearrangement.

In a method of reading the entire recording area of the recording medium serving as the replication source as image data and writing the image data in the recording medium serving as the replication destination, the entire recording area typically is replicated irrespective of the amount of the valid data in the recording area of the replication source serving as a replication target. Accordingly, when a ratio of the amount of the valid data to the capacity of the recording area is low, unnecessary data replication is incremented, the whole time required for data replication may not be reduced. For example, when data of one byte recorded in a CD-ROM is replicated to other CD-R and data of 100 Mbytes recorded in the CD-ROM is replicated to other CD-R, times required for both data replicating operations become substantially the same as each other.

In a method disclosed in JP-A-6-309116, it is necessary to manage a recording status in advance in the unit of a physical record by reading all recording areas of a master disc, thereby incrementing the processing time or the load. Since skip data SD is not recorded in a disc to be replicated at the time of Additionally replicating data in a replication disc of the replication destination, the same process may not be performed. In addition, it is necessary to secure the recording area for recording the skip data SD, thereby reducing the capacity of the recording area.

In view of the above status, it is desirable to make it possible to reduce the time required for the data replication by reducing unnecessary reading or writing of data irrespective of the amount of the data.

According to a first embodiment of the invention, an information processing device performing replication of data between recording media so that valid information recorded in a first recording medium is recorded in a second recording medium includes a replication control unit controlling the replication of the data so that only information of an allocation space which is an area having the valid information recorded therein is read from the first recording medium serving as a replication source and the read valid information is written in the second recording medium serving as a replication destination.

The information processing device according to the embodiment of the invention further includes a replication region specifying unit specifying a region of the first recording medium to be replicated by specifying the allocation space in a recording area of the first recording medium, wherein the replication control unit controls the replication of the data so that the only information of the allocation space specified by the replication region specifying unit is read and the read information is written in the second recording medium.

In the information processing device, the replication region specifying unit has a first preparation unit preparing first allocation information for specifying the allocation space on the basis of first management data for managing information on an unallocation space in the recording area of the first recording medium serving as an area in which the valid information is not recorded.

In the information processing device, the first management data manages a leading address and a length of the unallocation space, and the first preparation unit prepares the first allocation information for specifying a leading address and a length of the allocation space managed by the first management data on the basis of the leading address and the length of the unallocation space.

In the information processing device, the first preparation unit deletes information specifying an allocation space including an area in which predetermined valid information is stored from the first allocation information.

In the information processing device, the replication region specifying unit further includes a second preparation unit preparing second allocation information for specifying the allocation space on the basis of second management data for managing the information on the unallocation space of the area in which the predetermined valid information is stored.

In the information processing device, the second management data has a bit string managing whether or not the valid information is recorded in sectors of the area in which the predetermined valid information is stored by values of bits and the second preparation unit prepares the second allocation space for specifying the leading address and the length of the allocation space in the area in which the predetermined valid information is stored on the basis of the values of the bits of the bit string.

In the information processing device, the second preparation unit prepares the second allocation information by converting the leading address of the allocation space in the area in which the predetermined valid information is stored into the address in the area in which the predetermined valid information is stored to an address in the entire recording area of the first recording medium.

In the information processing device, the replication region specifying unit further includes a sort unit incorporating the first allocation information prepared by the first preparation unit and the second allocation information prepared by the second preparation unit, and sorting the information of the allocation space in the ascending order of the leading address of the allocation space so as to prepare third allocation information.

The information processing device according to the embodiment of the invention further includes a defect processing unit performing a predetermined process for a defect occurring in a recording area of the second recording medium.

In the information processing device, the defect processing unit abnormally ends a replication process for occurrence of the defect as the predetermined process.

In the information processing device, the defect processing unit avoids an area in which the defect occurs for the occurrence of the defect and performs writing in a reserve area as the predetermined process.

The information processing device according to the embodiment of the invention further includes a reading unit reading the only information of the allocation space from the first recording medium on the basis of control of the replication control unit; and a writing unit writing the information of the allocation space read by the reading unit in the second recording medium on the basis of the control of the replication control unit.

The information processing device according to the embodiment of the invention further includes a display control unit allows a user to display a GUI screen for inputting a user's instruction relating to the data replication on a display screen; and an input reception unit receiving the user's instruction input by the user on the basis of the GUI screen.

The information processing device according to the embodiment of the invention further includes a communication unit communicating with a reading device reading the only information of the allocation space from the first recording medium and a writing device writing the information of the allocation space in the second recording medium, and supplying control information for the data replication generated by the replication control unit to the reading device and the writing device.

According to a second embodiment of the invention, a method of performing data replication between recording media so that valid information recorded in a first recording medium is recorded in a second recording medium includes the steps of reading only information of an allocation space serving as an area in which the valid information is recorded from the first recording medium serving as a replication source and writing the information read from the recording medium in the second recording medium serving as a replication destination.

According to further embodiments of the invention, there are provided a program for making a computer perform data replication between recording media so that valid information recorded in a first recording medium is recorded in a second recording medium, the program including the steps of reading only information of an allocation space serving as an area in which the valid information is recorded from the first recording medium serving as a replication source and writing the information read from the first recording medium in the second recording medium serving as a replication destination: and a recording medium in which the program is recorded.

According to the embodiment of the invention, data replication is controlled such that only information of an allocation space serving as an area in which the valid information is recorded is read from the first recording medium serving as a replication source and the information read from the recording medium is written in the second recording medium serving as a replication destination.

According to a fourth embodiment of the invention, an information processing device includes a replication unit replicates valid information to a second recording medium serving as a replication destination from a first recording medium serving as a replication source; and a replication control unit controlling the replication unit to read information of an allocation space serving as an area in which the valid information is recorded from the first recording medium and write the read information in the second recording medium.

According to a fifth embodiment of the invention, an information processing method includes the steps of replicating valid information to a second recording medium serving as a replication destination from a first recording medium serving as a replication source; and reading information of an allocation space serving as an area in which the valid information is recoded from the first recording medium and writing the read information in the second recording medium.

According to a sixth embodiment of the invention, only information of an allocation space serving as an area in which the valid information is recorded is read from the first recording medium and the information read from the recording medium is written in the second recording medium. As the result, the valid information is replicated to the second recording medium serving as the replication destination from the first recording medium serving as the replication source.

BRIEF DESCRIPTION OF THE DRAWINGS

FIG. 8 is a diagram illustrating a configuration example of a second ASE.

FIG. 15 is a block diagram illustrating a configuration example of a personal computer according to an embodiment of the invention.

DETAILED DESCRIPTION OF THE PREFERRED EMBODIMENTS

Hereinafter, preferred embodiments of the present invention will be described with reference to the accompanying drawings.

Figure 1:
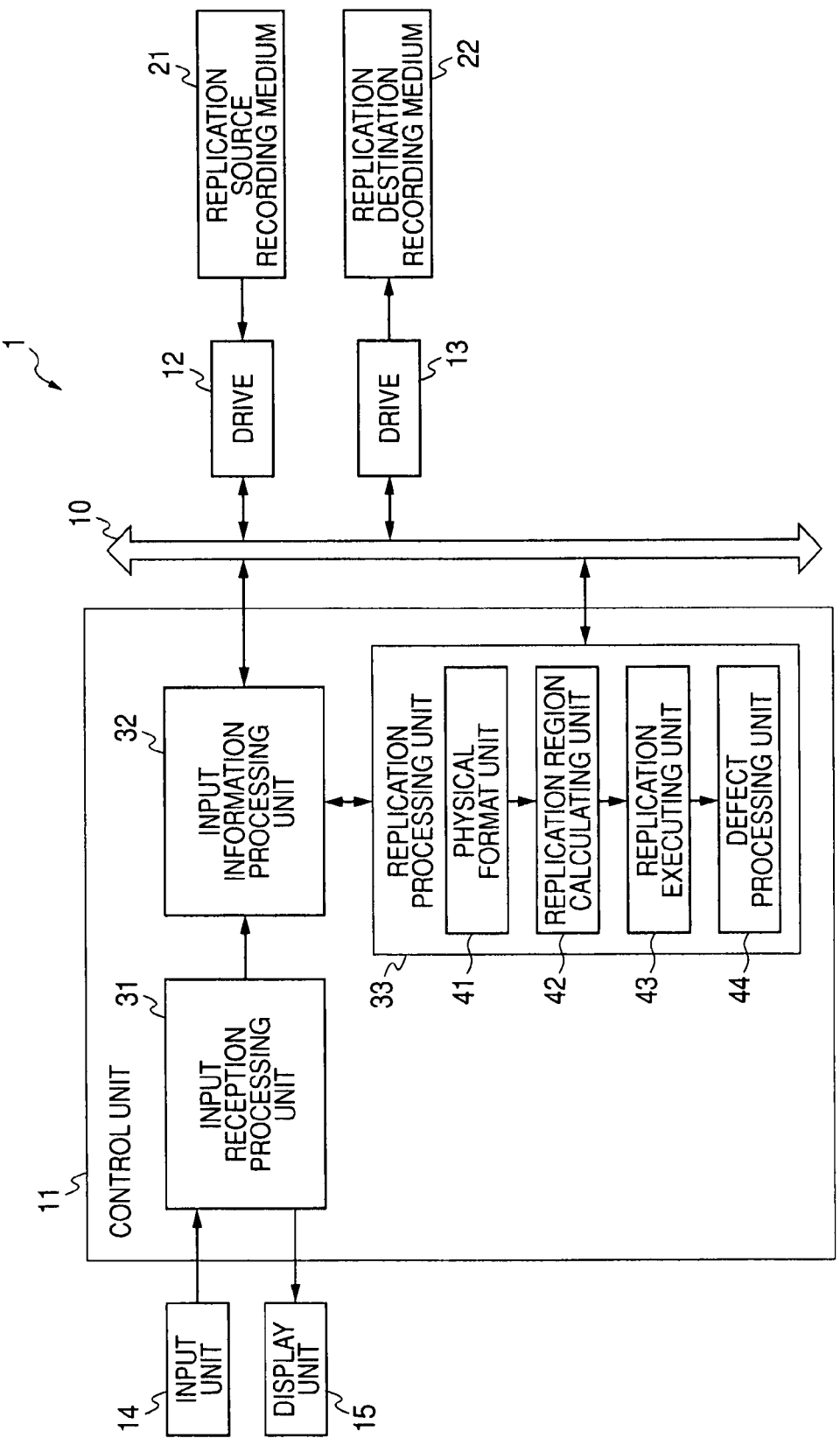
FIG. 1 is a block diagram illustrating a configuration example of a replication device according to an embodiment of the invention.

FIG. 1 is a block diagram illustrating a configuration example of a replication device according an embodiment of the invention.

A replication device 1 shown in FIG. 1 serves as an information processing device performing a process relating to replication of data recorded in a recording medium such as a CD (Compact Disc) or a DVD (Digital Versatile Disc) and has a control unit 11, a drive 12, and a drive 13 which are interconnected via a bus 10. The replication device 1 serves as a device used for preparing, for example, a back-up disc or a copy disc (a replication disc) and serves as a device writing a replica of information recorded in a replication source recording medium 21 serving as a recording medium mounted in the drive 12 in a replication destination recording medium 22 serving as a recording medium mounted in the drive 13.

Accordingly, the replica of the information recorded in the replication source recording medium 21 is recorded in the replication destination recording medium 22. In other words, the replication device 1 performs a replication process, whereby the replication destination recording medium 22 serves as a copy disc or a back-up disc of the destination source recording medium 21.

The bus 10 includes buses of a predetermined specification such as an ISA bus (Industry Standard Architecture bus), a PCI bus (Peripheral Components Interconnect bus), a PCI Express, a USB (Universal Serial Bus), and an IEEE (Institute of Electrical and Electronic Engineers) 1394. Information exchanged between processing units connected to the bus 10 is transmitted to the bus 10. Any bus may be used as the bus 10 and a serial bus or a parallel bus may be used as the bus 10. However, the processing units connected to the bus 10 correspond to the specification of the bus 10.

The control unit 11 performs a control process relating to replication of the information. The control unit 11 allows the information recorded in the replication source recording medium 21 mounted in the drive 12 to be read to the drive 12 connected via the bus 10 and to be written in the replication destination recording medium 22 mounted in the drive 13 in the drive 13 connected via the bus 10.

The drive 12 serves as a reading device reading information from a predetermined recording medium such as the CD or the DVD. The drive 12 is controlled by the control unit 11. The drive 12 reads the information from the replication source recording medium 21 mounted therein and supplies the information to the control unit 11 serving as a request source via the bus 10. The drive 12 further has an information writing function and may write the information in a writable recording medium mounted therein on the basis of, for example, control of the control unit 11.

The drive 13 serves as a writing device writing information in predetermined writable recording media such as a CD-R (Compact disc-Recordable), a DVD-R (Digital Versatile Disc-Recordable), and a DVD+R (Digital Versatile Disc+Recordable). When the drive 13 acquires the information supplied from the control unit 11 via the bus 10, it writes the acquired information in the replication destination recording medium 22 mounted therein on the basis of the control of the control unit 11. The drive 13 further includes an information reading function and may read the information recorded in the mounted recording medium.

The replication source recording medium 21 serves as a recording medium in which information serving as a replication target is recorded and is an optical disc represented by "BLU-RAY DISC (Registered Trademark of Sony Corporation)". The replication source recording medium 21 corresponds to the drive 12 and is a recording medium from which the drive 12 can read the information. Hereinafter, BLU-RAY DISC is used as the replication source recording medium 21, but other disc such as the CD, the DVD, or an HD DVD (High Definition Digital Versatile disc) may be used. As the replication source recording medium 21, it may suffice as long as the information regarded as the replication target is recorded therein, and it may be a read-only optical disc such as a BD-ROM (BLU-RAY DISC READ ONLY MEMORY) or a writable optical disc such as a BD-R (BLU-RAY DISC-Recordable) or a BD-RE (BLU-RAY DISC-REwritable), for example.

The replication destination recording medium 22 serves as a recording medium in which the information read from the replication source recording medium 21 is written and is the writable optical disc represented by the BD-R or the BD-RE which is BLU-RAY DISC. The replication destination recording medium 22 corresponds to the drive 13 and is a recording medium in which the drive 13 can write the information. Hereinafter, the replication destination recording medium 22 is described with BLU-RAY DISC, but may be described with other writable optical disc such as the CD-R, a CR-RW (Compact Disc-ReWritable), the DVD-R, a DVD-RW (Digital Versatile Disc-ReWritable), the DVD+R, a DVD+RW (Digital Versatile Disc+ReWritable), a DVD-RAM (Digital Versatile Disc-Random Access Memory), and HD DVD-ARW (High Definition Digital Versatile Disc-Advanced Rewritable).

Hereinafter, capacities of the replication source recording medium 21 and the replication destination recording medium 22 are regarded as the same as each other. A logical format of the replication source recording medium 21 and the replication destination recording medium 22 is set to an XDCAM (Registered Trademark of Sony Corporation) file format based on an UDF (Universal disc Format) 2.5.

The XDCAM file format is a file format used in a video producing and editing system and is a file format for primarily managing a file of an AV (Audio Visual) data file such as a video or an audio, or a file of data associated with the AV data.

An input unit 14 and a display unit 15 are additionally connected to the control unit 11 of FIG. 1.

The input unit 14 includes an input device such as a keyboard, a mouse, a touch panel, or a remote controller, and accepts a user's instruction input by user's manipulation and supplies the information to the control unit 11. The display unit 15 includes a monitor represented by a CRT (Cathode Ray Tube), an LCD (Liquid Crystal Display), or an OELD (Organic ElectroLuminescencece Display: Organic EL Display). The display unit 15 displays the information supplied from the control unit 11 and exhibits the information to the user. In other words, the input unit 14 and the display unit 15 operate as a user interface for the user of the replication device 1.

As shown in FIG. 1, the control unit 11 includes an input reception processing unit 31, an input information processing unit 32, and a replication processing unit 33.

The input reception processing unit 31 controls the input unit 14 and the display unit 15, and performs a process relating to the user interface. For example, the input reception processing unit 31 controls the display unit 15 and allows the display unit 15 to display a GUI (Graphical User Interface) for accepting the user's instruction relating to replication, acquires the user's instruction for the GUI screen through the input unit 14, and supplies the acquired user's instruction to the input information processing unit 32. Although the GUI screen is specifically described later, the input reception processing unit 31 allows the display unit 15 to display the GUI screen, whereby the user can easily input the instruction on the basis of the displayed GUI screen.

The input information processing unit 32 analyzes the user's instruction supplied from the input reception processing unit 31 and performs various control processes on the basis of the instruction. For example, the input information processing unit 32 analyzes the user's instruction supplied from the input reception processing unit 31, specifies the drive 12 in which the replication source recording medium 21 is mounted and the drive 13 in which the replication destination recording medium 22 is mounted, or allows a replication processing unit 33 to start replication (preparation of the back-up disc or the copy disc) of the information.

The replication processing unit 33 performs the replication process, reads the information from the replication source recording medium 21 which is mounted in the drive 12, and writes the read information in the replication destination recording medium 22 which is mounted in the drive 13 designated by the user's instruction. The replication processing unit 33 includes a physical format unit 41, a replication region calculating unit 42, a replication executing unit 43, and a defect processing unit 44.

The physical format unit 41 is a processing unit which controls the drive 13 and performs a low-level initialization process (the physical format) such as sector arrangement in the recording area of the replication destination recording medium 22 which is mounted in the drive 13 as needed. As described above, the physical format unit 41 executes the physical format of the replication destination recording medium 22, whereby a recording medium which is inwritable and is not physically formatted may be used as the replication destination recording medium 22. In other words, the replication device 1 can perform replication to the recording medium which is not physically formatted.

The replication region calculating unit 42 performs calculation for specifying an area in which valid information is recorded, that is, a region to be replicated in the recording area of the replication source recording medium 21 from the entire recording area of the replication source recording medium 21. The recording area of the replication source recording medium 21 generally includes an area in which valid information such as the AV data or control information is recorded and an area (namely, a part in which data is not recorded) in which the valid information is not recorded. The replication region calculating unit 42 specifies, as an allocation space to which the valid information is allocated, the area in which the valid information, that is, the valid information serving as an original replication target is recorded, prepares allocation space information (hereinafter, referred to as "ASE" (Allocated Space Entry)) on a position or a length of an allocation space, and supplies the ASE to the replication executing unit 43.

In other words, the allocation space represents an area in which the valid information is recorded and sectors are successively arranged in a volume area formed in the recording area. The ASE maintains information such as leading addresses and lengths of the allocation spaces which exist all over the volume area as a space descriptor.

The replication region calculating unit 42 sorts allocation space descriptors in a leading address ascending order of the allocation space in the calculated ASE.

The replication executing unit 43 reads the allocation space descriptors from the ASE supplied from the replication region calculating unit 42 one by one, controls the drives 12 and 13 via the bus 10, reads only information of the allocation space from the replication source recording medium 21, and writes the only information of the allocation space in the replication destination recording medium 22. As described above, the replication executing unit 43 can easily replicate the only information of the allocation space on the basis of information of the allocation space descriptors of the ASE.

As described above, since the replication executing unit 43 can reduce unnecessary reading from or writing in an area (an unallocation space) in which the valid information is not allocated, it is possible to reduce a replication time and reduce a load of the replication process in comparison with a method of preparing image data of the entire recording area of the replication source recording medium 21 and recording the image data in the replication destination recording medium 22.

Since the replication executing unit 43 performs the replication process on the basis of the ASE, the replication executing unit 43 can omit processes such as address calculation or information update. Accordingly, the replication executing unit 43 can reduce the replication time and the load of the replication process in comparison with the method of seeking and reading the valid information from the replication source recording medium 21, and writing the sought and read valid information in the replication destination recording medium 22.

Since the replication region calculating unit 42 prepares the ASE on the basis of unallocation space information which is recorded in the recording area of the replication source recording medium 21 based on the UDF 2.5, the replication region calculating unit 42 can easily prepare the ASE. In other words, the replication device 1 can easily reduce the unnecessary reading or writing in the replication process.

Since the amount of information (the writing amount) written in the replication destination recording medium 22 when the replication executing unit 43 perform the replication by using the ASE is generally smaller than that in the method of preparing the image data of the entire recording area of the replication source recording medium 21 and recording the prepared image data in the replication destination recording medium 22, a ratio in which a sector in which the valid information is written is a bad sector is reduced in the replication destination recording medium 22. In other words, the replication executing unit 43 can suppress an occurrence probability of the defect.

In particular, as the amount of data of the valid information which is recorded in the replication source recording medium 21 is smaller, the writing amount decreases. Accordingly, the occurrence probability of the defect is further suppressed.

The XDCAM file format represents a file format managing a file of the AV data such as visual data or audio data or information associated with the AV data. It is necessary to maintain (a real-time property) a predetermined processing speed at the time of reading or writing the visual data or the audio data in accordance with the nature of the data. For example, it is necessary to maintain (the real-time property) a reading speed at the time of continuously reading the visual data in time series so that a drop frame is not generated at the time of reproducing the visual data. Naturally, the real-time property is usually necessary similarly at the time of writing the visual data. As described above, other data (hereinafter, referred to as "real-time data") in which the real-time property is necessary includes substream data of the visual data and the audio data or real-time meta-data including associated information in which the real-time property is necessary, such as a time code or essence data.

The real-time data is successively recorded in time series so that seek does not occur at the time of reading or writing the real-time data if possible. Accordingly, a recording position of the real-time data is limited. Accordingly, when the defect occurs in the replication destination recording medium 22, it is necessary to make the replication destination recording medium 22 disabled or to perform a defect avoidance process such as writing of the real-time data in other area in which the defect does not exist in the unit of a predetermined data in which the real-time data is successively read so that the real-time property is not lost.

However, in the method of preparing the image data of the entire recording area of the replication source recording medium 21 and recording the prepared image data in the replication destination recording medium 22, since it is difficult to record the image data of the entire recording area by avoiding the bad sector (the recording capacities of the replication source recording medium 21 and the replication destination recording medium 22 are the same as each other, such a vacant area does not exist), it may be impossible to perform the defect avoidance process as a matter of fact. In other words, in this case, when even one bad sector exists in the replication destination recording medium 22, there is a high possibility that the replication will not be performed (there is a high possibility that a disabled medium will be generated). On the contrary, since the replication executing unit 43 can suppress the occurrence probability of the defect as described above, it is possible to reduce the occurrence probability of the disabled medium (there is a high possibility for success in the replication process).

The defect processing unit 44 promotes or avoids exchange of the recording media when the defect occurs in the replication destination recording medium 22. By this configuration, the control unit 11 can perform an appropriate response such as avoidance of the bad sector or notification of defect occurrence to the user even when the defect occurs in the replication destination recording medium 22.

As described above, the replication processing unit 33 can shorten the time required for the data replication by reducing the unnecessary reading amount or writing amount. The replication processing unit 33 may suppress the occurrence probability of the defect by reducing the unnecessary writing amount. In addition, since the allocation spaces of the ASE are sorted in the address order, the replication processing unit 33 can shorten the time required for the replication process by reducing occurrence of the seek.

In other words, the control unit 11 can control the replication so as to reduce the unnecessary reading or writing of the data irrespective of the amount of the data, shorten the time required for the data replication, suppress the occurrence probability of the defect, and reduce the seek time at the time of writing the data.

Accordingly, the replication device 1 can reduce the unnecessary reading or writing of the data irrespective the amount of the data, shorten the time required for the data replication, suppress the occurrence probability of the defect, and reduce the seek time at the time of writing the data in the data replication in the unit of the recording medium in which the replica of the valid information, which is recorded in the recording medium serving as the replication source in the recording medium serving as the replication destination.

Figure 2:
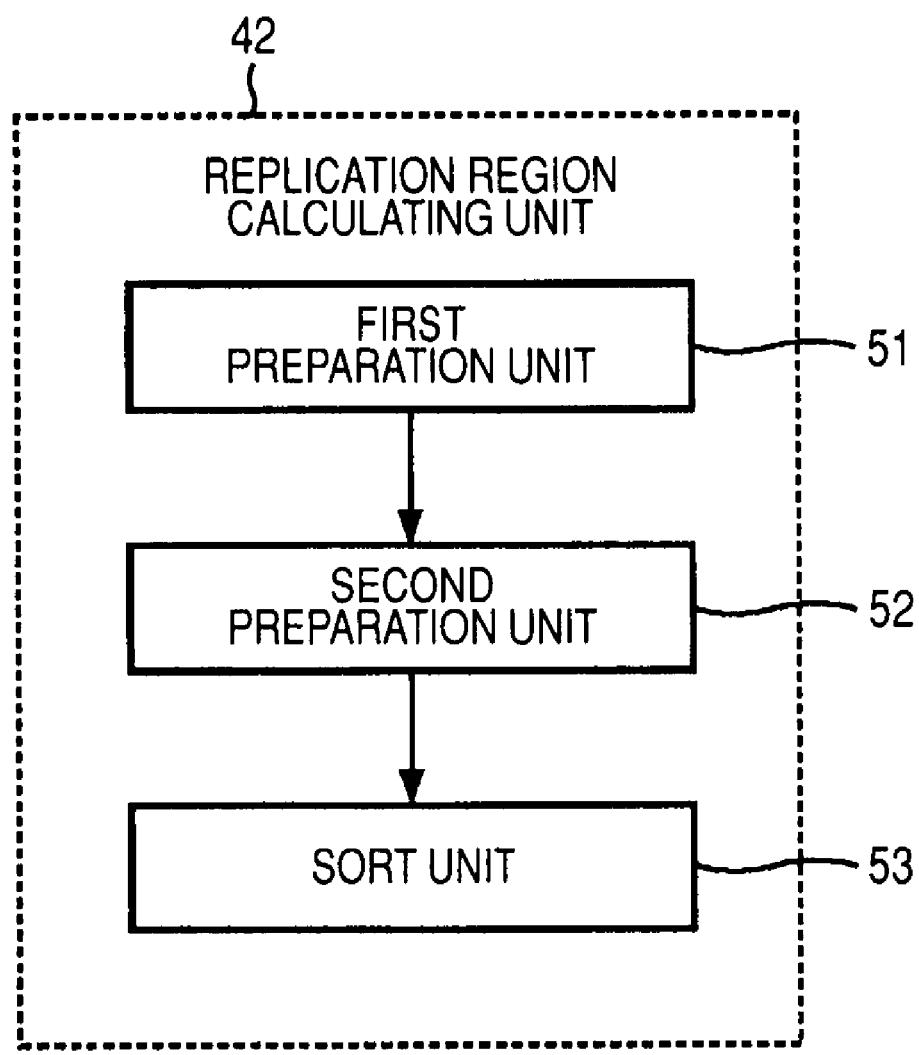
FIG. 2 is a block diagram illustrating a detailed configuration example of a replication region calculating unit of FIG. 1.

FIG. 2 is a block diagram illustrating a detailed configuration example of the replication region calculating unit 42 of FIG. 1.

The replication region calculating unit 42 includes a first preparation unit 51, a second preparation unit 52, and a sort unit 53.

The first preparation unit 51 prepares a first ASE serving as allocation space information for entire logical volume on the basis of a USD (Unallocated Space Descriptor) serving as unallocation space information in the unit of a logical volume, which is recorded in the replication source recording medium 21. In the XDCAM file format, one logical volume is formed in one recording medium.

The second preparation unit 52 prepares a second ASE serving as the allocation information in the partition area on the basis of a USB (Unallocated Space Bitmap) having information on unallocation with respect to the entire sector of the partition area in the logical volume, which is recorded in the replication source recording medium 21.

The sort unit 53 prepares an incorporation ASE by incorporating the first ASE prepared by the first preparation unit 51 and the second ASE prepared by the second preparation unit 52. Then, the sort unit 53 sorts and incorporates the information (allocation space descriptors) on the allocation spaces of the first ASE and the second ASE on the addresses thereof.

Here, configurations of the information will be described.

Figure 3:
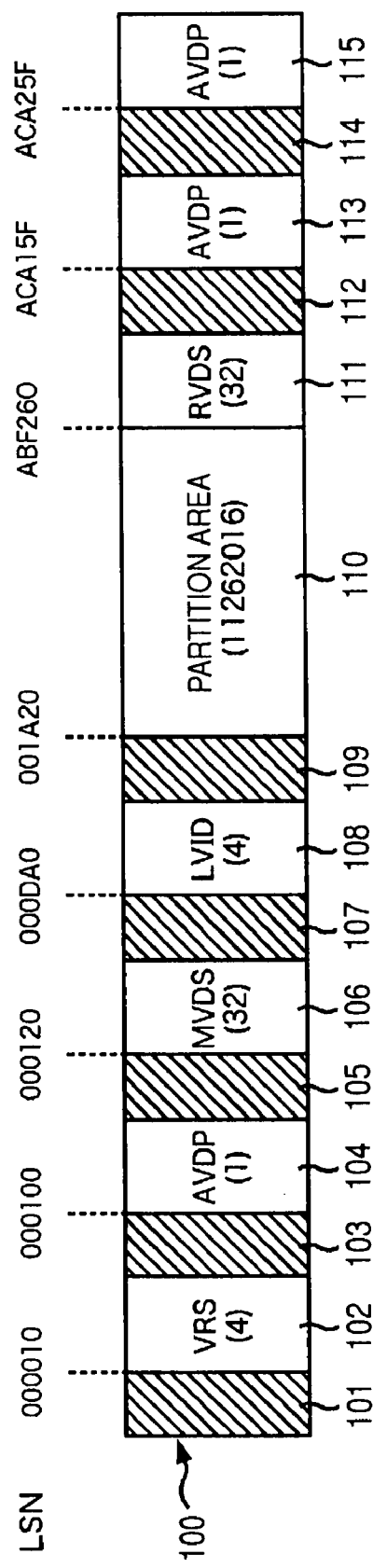
FIG. 3 is a diagram illustrating a configuration example of a volume area.

FIG. 3 is a diagram illustrating a configuration example of the volume area.

As shown in FIG. 3, a volume area 100 is formed in the recording area of the replication source recording medium 21 in accordance with the specification of the UDF 2.5. In FIG. 3, parts shown by slant lines in the volume area 100 represent unallocations spaces (an unallocation space 101, an unallocation space 103, an unallocation space 105, an unallocation space 107, an unallocation space 109, an unallocation space 112, and an unallocation space 114) in which the valid information is not allocated.

In other words, in parts other than the parts shown by the slat lines, a VRS (Volume Recognition Sequence) 102 serving as a volume recognition sequence, an AVDP (Anchor Volume Descriptor Pointer) 104 serving as an anchor volume descriptor pointer, an MVDS (Main Volume Descriptor Sequence) 106 serving as a main volume descriptor sequence, an LVID (Logical Volume Integrity Descriptor) 108 serving as a logical volume integrity descriptor, a partition area 110, an RVDS (Reserve Volume Descriptor Sequence) 111 serving as a reserve volume descriptor sequence, an AVDP 113 serving as the anchor volume descriptor pointer, and an AVDP 115 serving as the anchor volume descriptor pointer.

A numeric in parentheses shown in each of the allocation spaces represents the number (a decimal number) of sectors of the allocation space. In FIG. 3, a numeric (a hexadecimal number) shown above the volume area 100 represents leading addresses of each of the allocation spaces shown by a sector number (hereinafter, referred to as "LSN" (Logical Sector Number)) in the logical volume. In the UDF 2.5, one sector has 2 KB (kilobytes).

The LVID 108 includes the USD serving as the unallocation space information of the volume area 100. The USD has information on leading addresses and lengths of the unallocation spaces 103, 105, 107, 109, 112, and 114. A configuration of the USD is described later, and the leading address of each of the unallocation space is represented by the LSN and the length thereof is represented by the number of sectors. The unallocation space 101 corresponds to leading 16 sectors of the volume area 100. Since the area is disabled in accordance of a regulation of the UDF 2.5, it is not included in the USD. In the UDF 2.5, the unallocation space of the partition area 110 in which predetermined valid information such as the AV data is stored is managed by the USB different from the USD. In other words, allocation part and unallocation part of the valid information exist in the partition area 110 and the entire partition area 110 is managed as the allocation space in the USD. The USB will be specifically described later. An address of the USB is managed in the USD.

Figure 4:
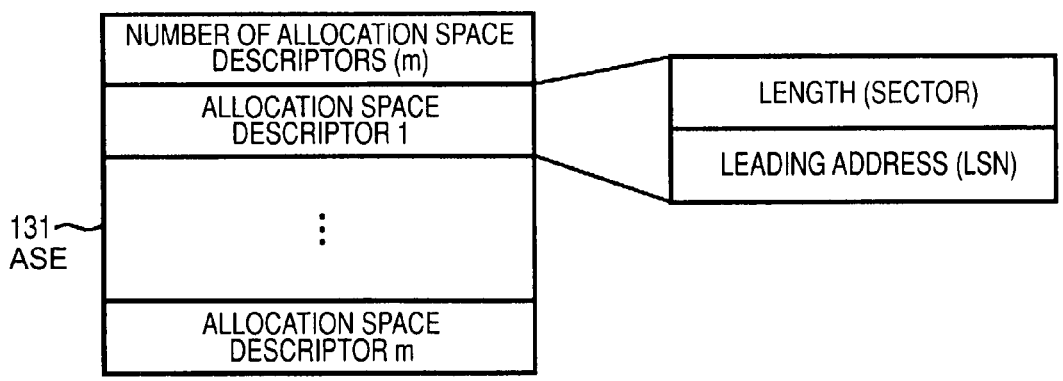
FIG. 4 is a diagram illustrating a configuration example of an ASE.

FIG. 4 is a diagram illustrating a configuration example of the ASE.

An ASE 131 has m allocation space descriptors including information on different allocation spaces and an allocation space descriptor number serving as information representing the number (m) of the allocation space descriptors. Each of the allocation space descriptors has the leading address and the length of each of the allocation spaces. The leading address is represented by the LSN serving as the sector number in the logical volume and the length is represented by the number of sectors. The allocation space descriptors are sorted in the ascending order of the leading address of the allocation space corresponding to each of the allocation space descriptors.

The first ASE, the second ASE, and the incorporation ASE have the same configuration as the ASE 131 of FIG. 4.

Figure 5:
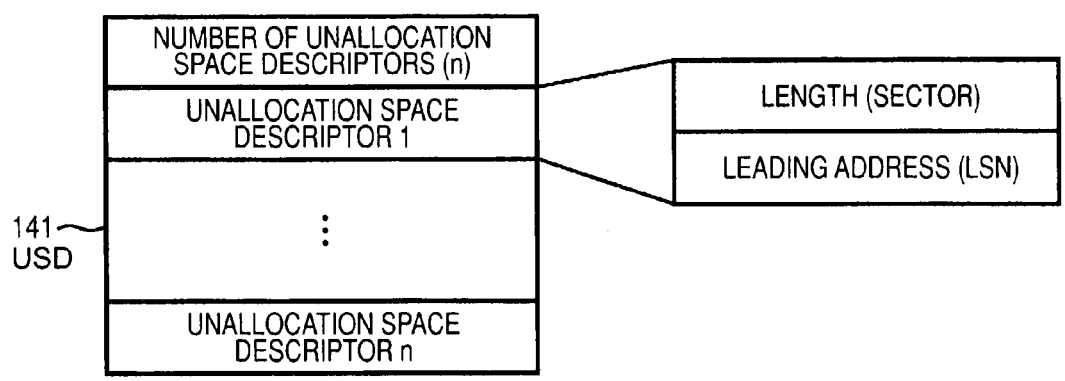
FIG. 5 is a diagram illustrating a configuration example of a USD.

FIG. 5 is a diagram illustrating a configuration example of the USD.

An USD 141 n unallocation space descriptors including different unallocation space information and an unallocation space descriptor number serving as information representing the number (n) of the unallocation space descriptors. Each of the unallocation space descriptors has information on the leading address and the length of each of the unallocation space. The leading address is represented by the LSN serving as the sector number in the logic volume and the length is represented by the number of sectors.

The first preparation unit 51 of FIG. 2 prepares the ASE 131 (namely, the first ASE) on the basis of the USD 141. Accordingly, the first preparation unit 51 can prepare the first ASE more easily, compared with a case where the allocation space is specified by seeking the valid information from the replication source recording medium 21.

Figure 6:
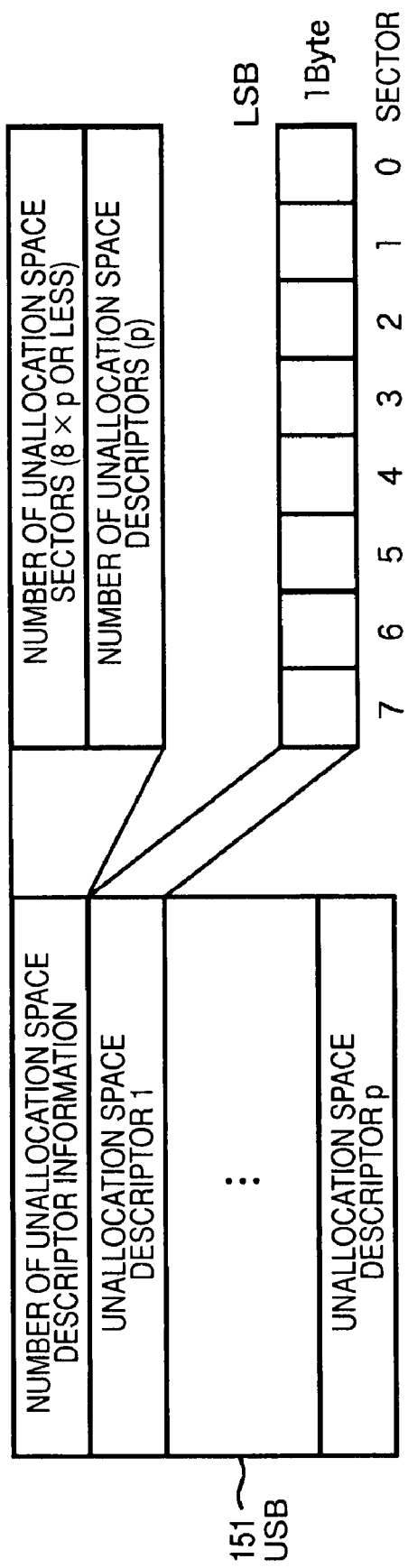
FIG. 6 is a diagram illustrating a configuration example of a USB.

FIG. 6 is a diagram illustrating a configuration example of the USB.

A USB 151 has p unallocation space descriptors including different unallocation space information and unallocation space descriptor information serving as information on the unallocation space descriptors in the partition 110. The unallocation space descriptor information has an unallocation space sector number representing the total number (8×P or less) of sectors in the unallocation space which exists in the partition area 110 and an unallocation space descriptor number representing the number (p) of the unallocation space descriptors.

Each of the unallocation space descriptors is constituted by a bit string of 1 byte (8 bits) as shown in FIG. 6. Bits of the bit string correspond to sectors in the partition area 110, respectively. The values of the bits show whether or not the valid information is allocated. For example, when the value of the bit is "1", the valid information is not allocated in sectors corresponding to the bit and the sectors are the unallocation spaces. On the contrary, when the value of the bit is "0", the valid information is allocated in sectors corresponding to the bit and the sectors are the allocation spaces.

Figure 7:
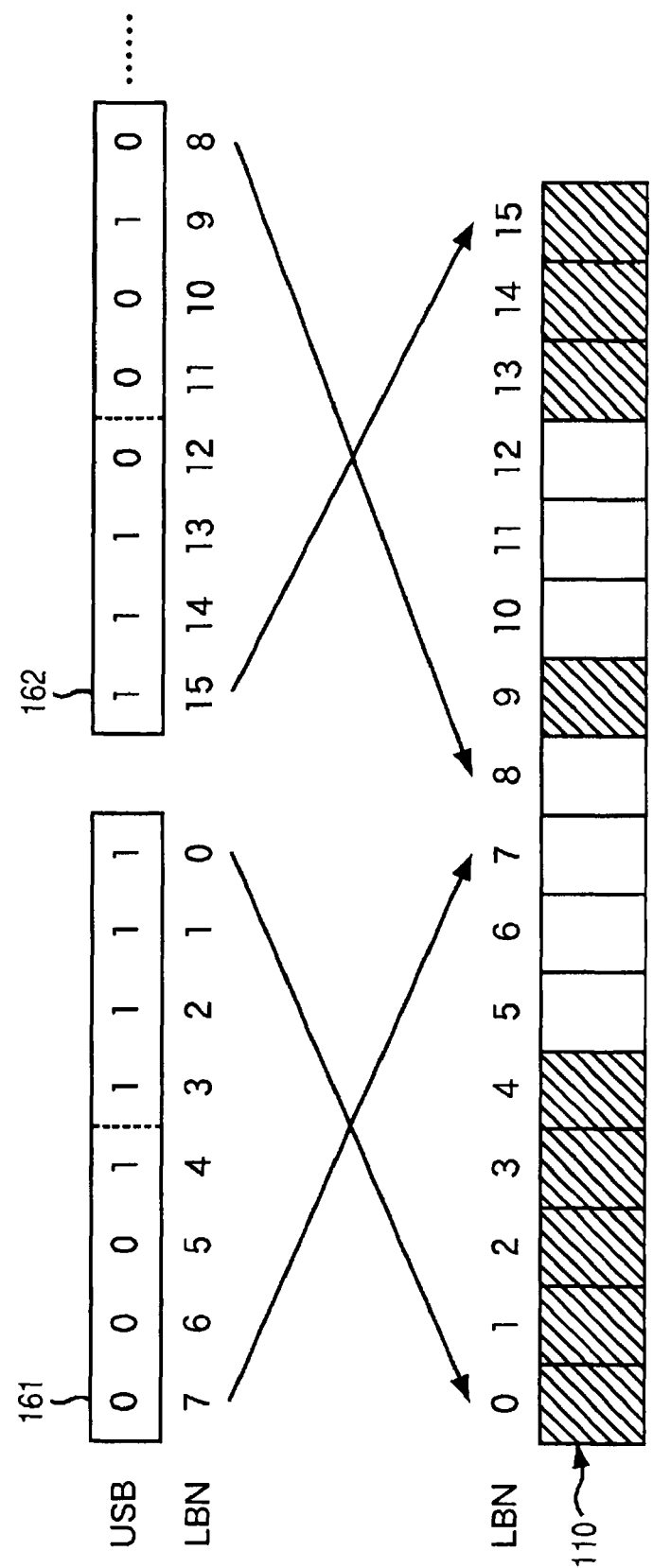
FIG. 7 is a diagram illustrating a configuration example of a partition area.

FIG. 7 illustrates a correspondence relationship of the sectors in the bit string and the partition area 110.

As shown in FIG. 7, the bits of the bit string sorted in the ascending order from a first unallocation space descriptor to a p-th unallocation space descriptor are allocated to the sectors in the partition area 110 sorted in an ascending order from a sector having an LBN of 0 to a sector having an LBN of 8×p in the order of from an LSB (Less Significant Bit) to an MSB (Most Significant Bit).

For example, as shown in FIG. 7, a bit of an LSB of a first unallocation space descriptor 161 corresponds to the sector having the LBN of 0, which serves as a leading sector of the partition area and an immediate left bit of the LSB of the first unallocation space descriptor 161 corresponds to the sector having the LBN of 1. Similarly, 1 bit is allocated to one sector in sequence and a bit of an MSB of the first unallocation space descriptor 161 corresponds to a sector having an LBN of 7. A bit of the LSB of a second unallocation space descriptor 162 corresponds to a sector having an LBN of 8. Similarly, 1 bit is allocated to one sector in sequence and a bit of the MSB of the second unallocation space descriptor 161 corresponds to a sector having an LBN of 15. 1 bit of the Unallocation space descriptor is allocated to other sectors in the same sequence.

The value of the unallocation space descriptor shows whether or not the valid information is allocated to each of the sectors. In the example of FIG. 7, the value of the first unallocation space descriptor 161 is "1F" as the hexadecimal number and the value of the second unallocation space descriptor 162 is "E2" as the hexadecimal number. In other words, a sector having the LBN of 0 to a sector having an LBN of 4, a sector having an LBN of 9, and a sector having an LBN of 13 to a sector an LBN of 15 (parts shown by the slant lines in FIG. 7) are the unallocation spaces.

The second preparation unit 52 of FIG. 2 prepares the ASE 131 (namely, the second ASE) on the basis of the USB 151. In the second preparation unit 52, a sector group to which the valid information successively sorted is allocated from a sector having an LBN of 5 to a sector having an LBN of 8, which are shown in FIG. 7 is set to one allocation space. In other words, the sector having the LBN of 5 to the sector having the LBN of 8 in FIG. 7 forms one allocation space having a length (the number of sectors) of 4. Even in the second ASE, the leading address of each of the allocation spaces is represented by the LSN. In other words, the second preparation unit 52 converts the LBN of the leading sector in each of the allocation spaces into the LSN.

FIG. 8 is a diagram illustrating a configuration example of the second ASE.

As described above, a second ASE 171 has information on a leading address of the allocation space represented by the LSN and a length of the allocation space represented by the number of sectors similarly as the first ASE. In the example of FIG. 3, when the partition area 110 is started from a sector having an LSN of "001A20", the allocation space constituted by the sectors having the LBNs of 5 to 8 shown in the example of FIG. 7 is managed as the allocation space having the length of "4" and the leading address of "001A25" shown in the example of FIG. 8 in the second ASE 171. Similarly, in FIG. 7, the allocation space constituted by the sectors having the LBNs of 10 to 12 is managed as an allocation space having a length of "3" and a leading address of "001A2A" in the second ASE 171 similarly as the example of FIG. 8.

As described above, since the second preparation unit 52 prepares the second ASE on the basis of the USB, the second preparation unit 52 can prepare the second ASE more easily, compared with a case where the allocation space is specified by seeking the valid information from the replication source recording medium 21. The second preparation unit 52 can specify the allocation space in more detail and shorten the time required for the replication process by preparing the second ASE, compared with a case where the entire partition area 110 is set to the allocation space by using the only first ASE. Since the second preparation unit 52 converts the LBN of the leading address of the allocation space into the LSN at the time of preparing the second ASE, the second preparation unit 52 can easily incorporate the second ASE with the first ASE.

As described above, since the sort unit 53 sorts the first ASE and the second ASE in the ascending order on the basis of the leading address of the allocation space and incorporates them to prepare the incorporation ASE, the sort unit 53 can reduce the seek time at the time of reading or writing the valid information, and can shorten the time required for the replication process.

As described above, since the replication region calculating unit 42 prepares the ASE by using the USD or the USB of the UDF, it can easily prepare the ASE without special information for specifying the allocation space. Accordingly, the replication device 1 replicates the known general data as described above and can shorten the time required for the replication process. In other words, it may be possible to reduce a manufacturing cost or an operational cost of the replication unit 1. Since the replication device 1 does not require unnecessary information, it can shorten the time required for the replication process without reduction in recording capacity of the recording medium.

In addition, as described above, since the replication region calculating unit 42 prepares the ASE by using the USD or the USB, the replication region calculating unit 42 can prepare the ASE in a short time and in ease, compared with a case where the ASE is prepared by seeking the whole valid information from the recording area of the replication source recording medium 21. By this configuration, the replication device 1 can alleviate the load of the replication process and reduce the cost.

As described above, the replication device 1 performs the replication process in accordance with the user's instruction. The input reception processing unit 31 of the replication device 1 allows the GUI screen to be displayed on the display unit 15 and accepts the user's instruction.

Figure 9:
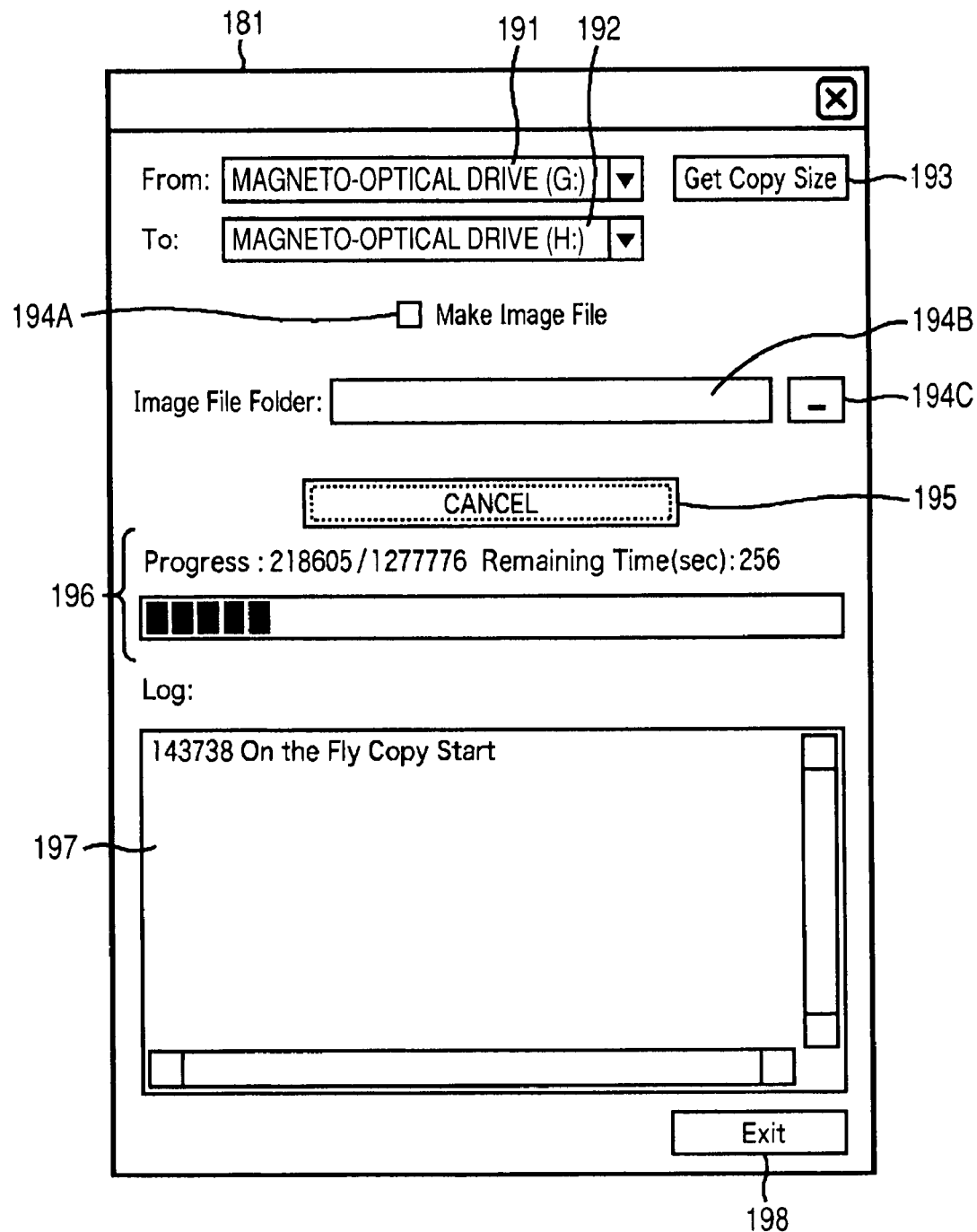
FIG. 9 is a diagram illustrating a configuration example of a replication manipulation screen.

FIG. 9 is a diagram illustrating a configuration example of a replication manipulation screen displayed on the display unit 15.

A replication manipulation screen 181 is the GUI screen for accepting the user's instruction.

The replication manipulation screen 181 includes a replication source specifying unit 191, a replication destination specifying unit 192, a replication data amount calculation instructing unit 193, an image file preparation instructing unit 194A, an image file preparation folder displaying unit 194B, an image file preparation folder designating unit 194C, an execution instructing unit 195, a status displaying unit 196, a result reporting unit 197, and a end button 198.

The replication source specifying unit 191 serves as an input unit allowing the user to specify the drive 12 in which the replication source recording medium 21 is mounted. In the example of FIG. 9, the replication source specifying unit 191 is constituted by a pull-down menu, but it may be constituted by any input unit.

The replication destination specifying unit 192 serves as an input unit allowing the user to specify the drive 13 in which the replication destination recording medium 22 is mounted. In the example of FIG. 9, the replication destination specifying unit 192 is constituted by the pull-down menu, but it may be constituted by any input unit.

Based on operation by the user, the replication data amount calculation instructing unit 193 serves as an input unit accepting an instruction of calculating the data amount of the information recorded in the replication source recording medium 21 mounted in the drive 12 specified by the replication source specifying unit 191, that is, the data amount to be replicated. For example, when the replication data amount calculation instructing unit 193 is manipulated, the input information processing unit 32 acquires the information from the replication source recording medium 21 and calculates the data amount. For example, a limitation may be given to a drive which can be specified by the replication destination specifying unit 192 on the basis of the calculated data amount.

The image file preparation instructing unit 194A serves as an input unit accepting an instruction of whether or not to prepare the image data by the user's manipulation before the information read from the replication source recording medium 21 mounted in the drive 12 is written in the replication destination recording medium 22 mounted in the drive 13. In the example of FIG. 9, the image file preparation instructing 194A is constituted by a check box, but it may be constituted by any input unit.

The image file preparation folder displaying unit 194B serves as a display unit displaying a path of a folder preparing the image file. The image file preparation folder designating unit 194C serves as an input unit used allowing the user to designate a folder in which the prepared image file is stored. The image file preparation folder designating unit 194C may be constituted by any input unit.

The execution instructing unit 195 serves as an input unit allowing the user to instruct a start of the replication process. In the example of FIG. 9, although a message "CANCEL" (cancel) is displayed on the execution instruction unit 195, this represents a state in which the execution instructing unit 195 is once manipulated and the replication process is performed. In other words, a message "START" (start) is displayed in a state where the replication process is not yet started prior to the user's manipulation. As shown in FIG. 9, when the user manipulates the execution instructing unit 195 again in a state in which the replication process is started and the message "CANCEL" (cancel) displayed, the executing replication process is stopped.

The status displaying unit 196 serves as a display unit for displaying a progress status of the executing replication process for the user. The result reporting unit 197 serves as a log display unit for displaying a processing result for the user. For example, when the replication process is normally ended, a message "Complete" is displayed and when the replication process is abnormally ended, a message "Error" is displayed. The end button 198 is a GUI button accepting a user's replication manipulation end instruction. When the user manipulates the end button 198, the replication process is ended and the replication manipulation screen 181 is closed. As described above, since the GUI screen is used, the user can easily input the instruction and easily grasp various processing statuses including the progress status of the replication process.

Figure 10:
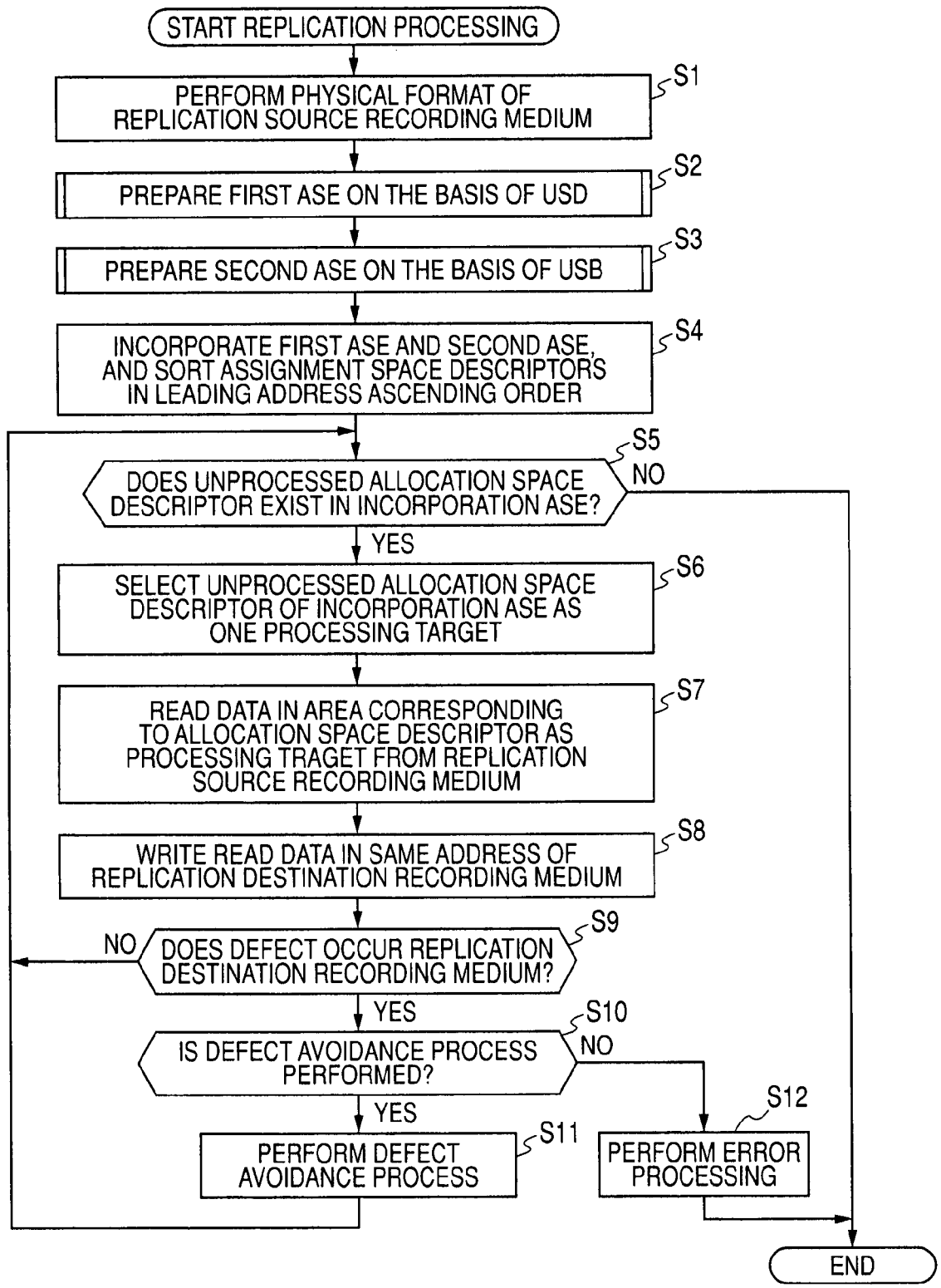
FIG. 10 is a flowchart illustrating an example of a flow of a replication process.

FIG. 10 is a flowchart illustrating an example of a flow of the replication process executed by the replication processing unit 33 of FIG. 1.

When the replication process is started, the physical format unit 41 of the replication processing unit 33 performs a physical format of the recording area in the replication destination recording medium 22 as needed in Step S1. The physical format of the recording area in the replication destination recording medium 22 has been already completed. The physical format is omitted if not necessary.

When the physical format of the recording area in the replication destination recording medium 22 has been already completed, the first preparation unit 51 of the replication region calculating unit 42 prepares the first ASE serving as the ASE for the entire volume area on the basis of the USD recorded in the replication source recording medium 21, in Step S2. A first ASE preparation process of preparing the first ASE will be specifically described later. When the first ASE is prepared, the second preparation unit 52 of the replication region calculating unit 42 prepares the second ASE serving as the ASE for the partition area 110 on the basis of the USB recorded in the replication source recording medium 21, in Step S3. A second ASE preparation process of preparing the second ASE will be specifically described later. When the first ASE and the second ASE are prepared, the sort unit 53 of the replication region calculating unit 42 incorporates the first ASE and the second ASE, and sorts each of the allocation space descriptors in the ascending order of the leading address of the allocation space. Actually, since each of the allocation space descriptors has been already sorted in the ascending order of the leading address of the allocation space in each of the first ASE and the second ASE, the sort unit 53 specifies a position (between allocation space descriptors) of the first ASE in which the second ASE is inserted and just inserts the second ASE in the position. In other words, the sort unit 53 can easily sort each of the allocation space descriptors of the incorporation ASE incorporating the first ASE and the second ASE.

When a process of Step S4 is ended, the replication region calculating unit 42 allows the process to proceed to Step S5. In Step S5, the replication executing unit 43 judges whether or not an unprocessed allocation space descriptor exists in the incorporation ASE prepared in the replication region calculating unit 42. When the replication executing unit 43 judges that the unprocessed allocation space descriptor exists in the incorporation ASE, the replication executing unit 43 allows the process to proceed to Step S6. The replication executing unit 43 selects the unprocessed allocation space descriptor of the incorporation ASE as one processing target and reads data of an area corresponding to an allocation space descriptor serving as a processing target from the replication source recording medium 21 in Step S7.

In Step S8, the replication executing unit 43 writes the read data in the same address (sector) of the recording area in the replication destination recording medium 22 as the address (sector) in the replication source recording medium 21. The replication executing unit 43 judges whether or not the defect occurs in the replication destination recording medium 22 in Step S9. When the replication executing unit 43 judges that the defect does not occur in the replication destination recording medium 22, the replication executing unit 43 allows the process to proceed to Step S5 and repeats the subsequent process for the subsequent unprocessed allocation space descriptors.

When the replication executing unit 43 judges that the defect occurs in the replication destination recording medium 22 in Step S9, the replication executing unit 43 allows the process to proceed to Step S10. The defect processing unit 44 judges whether or not to avoid the defect at the time of occurrence of the defect in Step S10. For example, when it is judged that a defect avoidance process is performed on the basis of setting conditions instructed by the user, the defect processing unit 44 allows the process to proceed to Step S11 and performs writing in a reserve area by avoiding a bad sector in the unit of predetermined data to perform the defect avoidance process. When the defect avoidance process is ended, the defect processing unit 44 returns the process to Step S5 and repeats a subsequent process for the subsequent unprocessed allocation space descriptor.

In other words, the replication processing unit 33 repeats Steps S5 to S11 and, with reference to the respective allocation space descriptor of the incorporation ASE one by one, performs replication of information in each of the allocation space for each allocation space.

When it is judged that the defect avoidance process is not performed due to unsetting of the defect avoidance process in Step S10, the defect processing unit 44 allows the process to proceed to Step S12. In Step S12, the defect processing unit 44 performs an error process by making the replication destination recording medium 22 disabled and ends the replication process.

In Step S5, the replication is performed on the basis of all allocation space descriptors of the incorporation ASE, and when it is judged that the unprocessed allocation space descriptor does not exist, the replication executing unit 43 ends the replication process.

Figure 11:
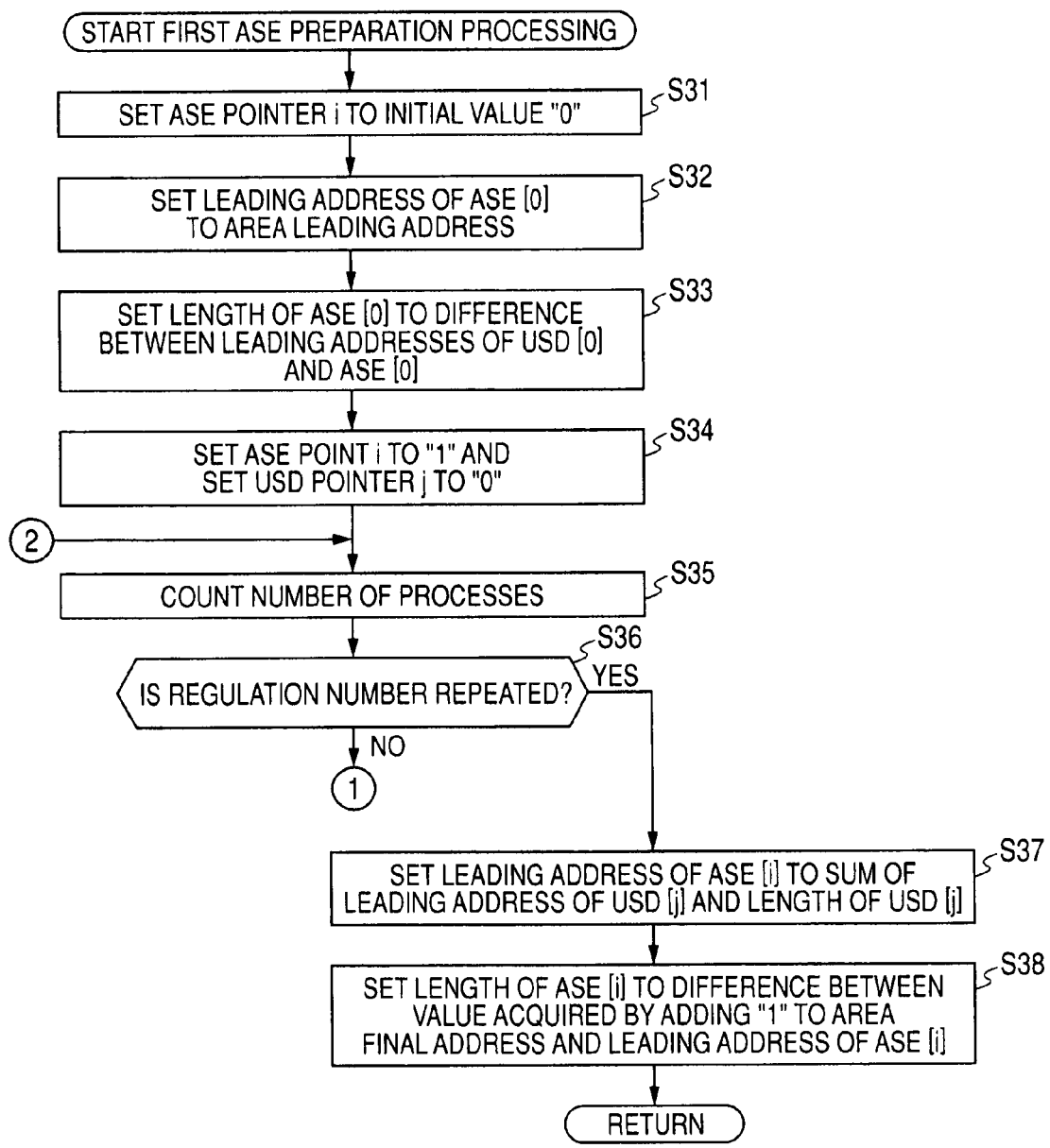
FIG. 11 is a flowchart illustrating an example of a flow of a first ASE preparation process.
Figure 12:
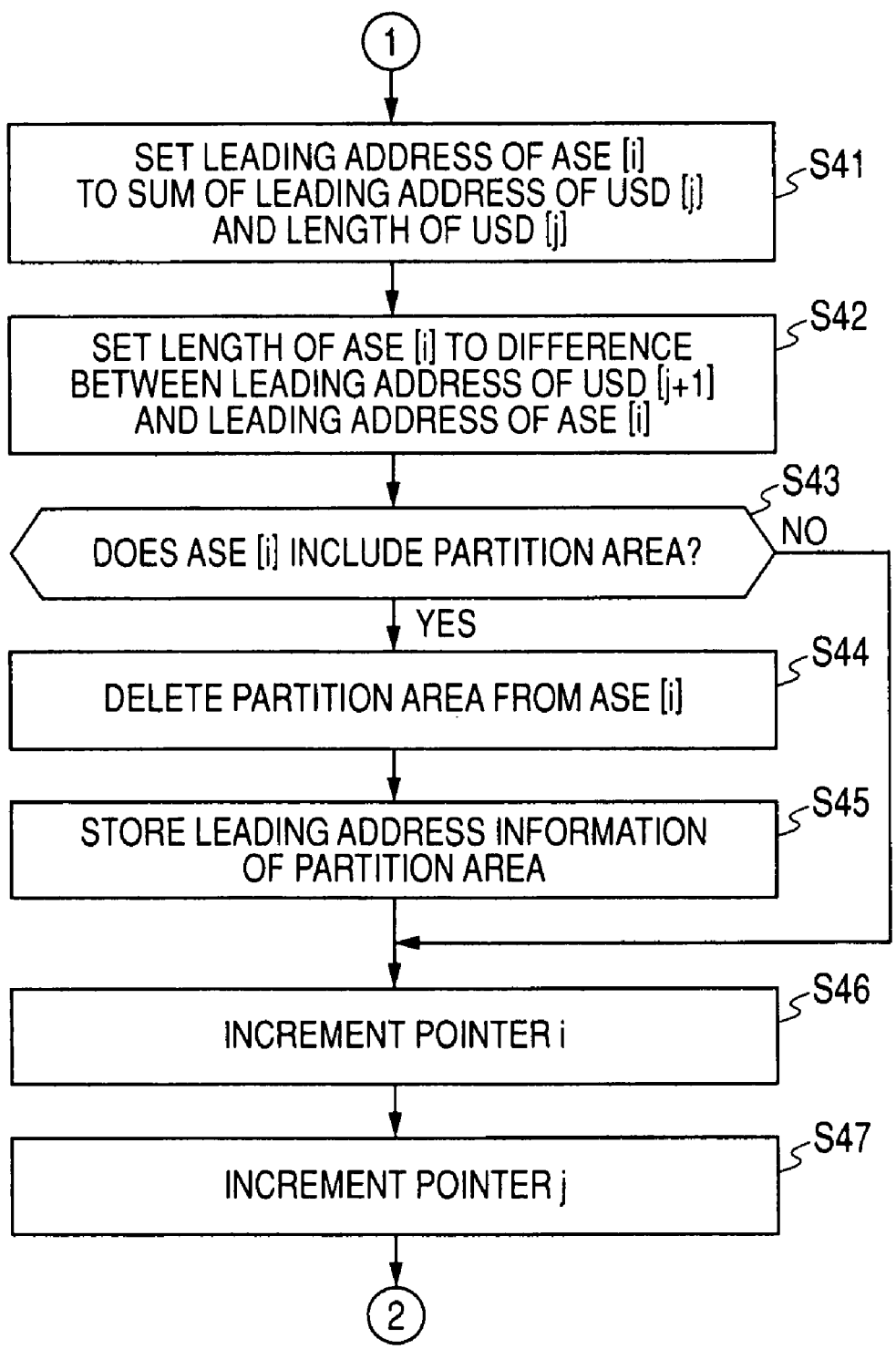
FIG. 12 is a flowchart illustrating an example of a flow of a first ASE preparation process, which is continued from FIG. 11.

Next, FIGS. 11 and 12 are flowcharts illustrating an example of a flow of the first ASE preparation process executed in Step S2 of FIG. 10.

When the first ASE preparation process is started, the first preparation unit 51 of the replication region calculating unit 42 sets a pointer i indicating the number of the allocation space descriptor of the ASE (the first ASE) to be prepared from now on to an initial value "0" in Step S31.

In Step S32, the first preparation unit 51 sets a leading address of ASE [0] serving as an initial allocation space in which information is described as an initial allocation space descriptor of the ASE to a leading address of the volume area. As described above, the area leading area (for example, 16 sectors) (the unallocation space 101 of FIG. 3) of the volume area is prescribed as the disabled area in the UDF 2.5. In other words, the area leading address is a leading address (LSN) in areas other than the disabled area.

In Step S33, the first preparation unit 51 sets a length of ASE [0] serving as the initial allocation space to a difference between leading addresses of USD [0] and ASE [0]. USD [0] is an initial unallocation space in which information is described as an unallocation space descriptor of the USD.

The initial allocation space descriptor of the ASE including information on the leading address and the length of the initial allocation space ASE [0] in the volume area is prepared by the processes in Steps S32 and S33 described above.

The first preparation unit 51 sets a pointer i of the ASE (the first ASE) to "1" and a pointer j of the USD to "0" in Step S34, and counts the number of processes in Step S35. In Step S36, the first preparation unit 51 judges whether or not a process shown in FIG. 12 to be described later is repeated in a regulation number with reference to a value acquired by counting the number of processes. When the first preparation unit 51 judges that the process is not repeated in the regulation number, the first preparation unit 51 allows the process to proceed to Step S41 of FIG. 12.

In Step S41 of FIG. 12, the first preparation unit 51 sets a leading address of ASE [i] serving as a (i+1)-th allocation space to the sum of a leading address and a length of USD [j] serving as a (j+1)-th unallocation space. In Step S42, the first preparation unit 51 sets a length of ASE [i] to a difference between the leading addresses of USD [j+1] and ASE [i].

In the processes in Steps S41 and S42, the (i+1)-th allocation space descriptor of the ASE including information on the leading address and the length of ASE [i] serving as the (i+1)-th allocation space in the volume area is maintained.

In Step S43, the first preparation unit 51 judges whether or not ASE [i] includes the partition area, and when the first preparation unit 51 judges that ASE [i] includes the partition area, the first preparation unit 51 allows the process to proceed to Step S44. The first preparation unit 51 deletes the partition area from ASE [i] in Step S44 and stores information on a leading address of the partition area in Step S45. When the process of Step S45 is ended, the first preparation unit 51 allows the process to proceed to Step S46.

In Step S43, when the first preparation unit 51 judges that ASE [i] does not include the partition area, the first preparation unit 51 omits the processes in Steps S44 and S45, and allows the process to proceed to Step S46.

The first preparation unit 51 increments the pointer i of the ASE by "+1" in Step S46 and increments the pointer j of the USD by "+1" in Step S47. When the process of Step S47 is ended, the first preparation unit 51 returns the process to Step S35 of FIG. 11 and repeats a subsequent process.

As described above, the preparation unit 51 sets the leading address of each allocation space ASE [i].

Referring back to FIG. 11, when it is judged that the preparation process of each allocation space descriptor shown in FIG. 12 is repeated in the regulation number in Step S36, the first preparation unit 51 allows the process to proceed to Step S37 and sets the leading address of ASE [i] to the sum of the leading address of USD [j] and the length of USD [j]. The first preparation unit 51 sets the length of ASE [i] to a difference between a value acquired by adding "1" to a final address in the area and the leading address of ASE [i] in Step S38.

In Steps S37 and S38, when the allocation space descriptor is prepared for a final allocation space, the first preparation unit 51 ends the preparation process of the first ASE, returns the process to Step S2 of FIG. 10, and performs the processes following Step S3.

Figure 13:
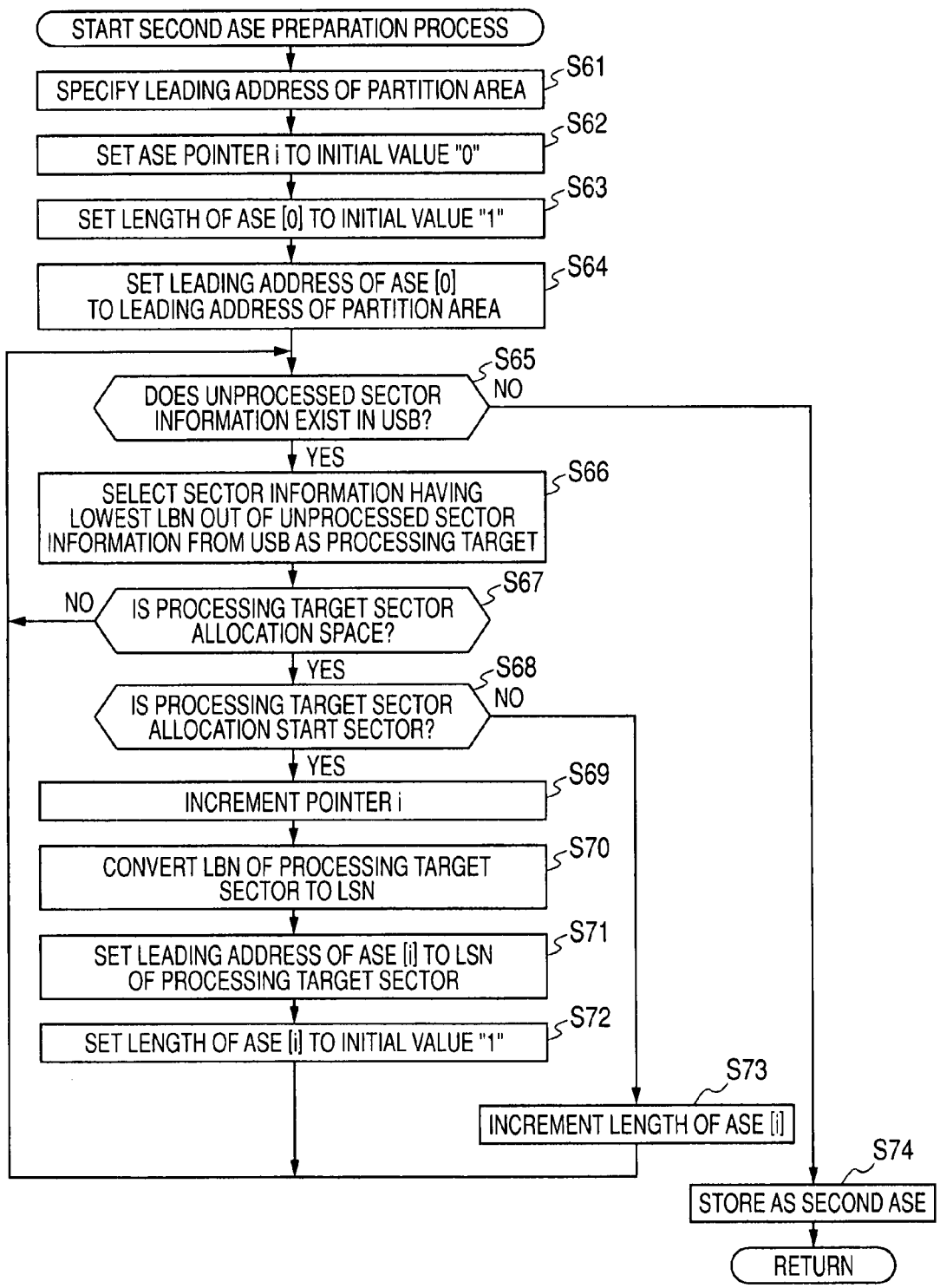
FIG. 13 is a flowchart illustrating an example of a flow of a second ASE preparation process.

Next, FIG. 13 is a flowchart illustrating an example of a flow of the second ASE preparation process executed in Step S3 of FIG. 10.

When the second ASE preparation process is started, the second preparation unit 52 of the replication region calculating unit 42 specifies the leading address of the partition area with the information stored in the process of Step S45 of FIG. 12 in Step S61.

In Step S62, the second preparation unit 52 sets the pointer i of the ASE (the second ASE) prepared by the second preparation unit 52 to the initial value "0". The pointer i represents the number of the allocation space in the partition area. In other words, ASE [i] represents the (i+1)-th allocation space in the partition area.

The second preparation unit 52 sets a length of ASE [0] to the initial value "1" in Step S63 and sets a leading address of ASE [0] to the leading address of the partition area in Step S64. In the processes in Steps S63 and S64, the second preparation unit 52 calculates a leading address and a length of an initial allocation space in the partition area, and prepares an allocation space descriptor including the information on the leading address and the length. In the process in Step S45 of FIG. 12, since the stored leading address of the partition area has the LSN, the leading address of ASE [0] is set to the LSN by the process of Step S64.

In Step S65, the second preparation unit 52 judges whether or not unprocessed sector information (bit information) exists in the USB. As described above, the bit information included in an allocation space descriptor of the USB is sector information indicating whether or not the valid information is allocated to each of the sectors in the partition area by a value of the bit information.

When the unprocessed sector information exists in the USB in Step S65, the second preparation unit 52 allows the process to proceed to Step S66. In Step S66, the second preparation unit 52 selects the sector information having the lowest LBN out of the unprocessed sector information from the USB as the processing target. In other words, the second preparation unit 52 selects the sector information (bit) as the processing target one by one in the ascending order.

In Step S67, the second preparation unit 52 judges whether or not a processing target sector serving as a sector of which information indicates a state of the sector is the allocation space with reference to the sector information (the value of the bit) selected as the processing target. When it is judged that the processing target sector is the unallocation space due to unallocation of the valid information to the processing target sector, the second preparation unit 52 returns the process to Step S65 and repeats the subsequent process so that the subsequent sector is selected as the processing target.

In Step S67, when the value of the bit is "0" and it is judged that the valid information is allocated to the processing target sector, the second preparation unit 52 allows the process to proceed to Step S68. In Step S68, the second preparation unit 52 judges whether or not the processing target sector is an allocation start sector located in a lead of the allocation space. When a sector just before the processing target sector is the unallocation space sector and it is judged that the processing target sector is the allocation start sector, the second preparation unit 52 allows the process to proceed to Step S69, increments the pointer i of the ASE by "+1", and adds the LBN of the processing target sector to the leading address of the partition area to convert it into the LSN in Step S70. The second preparation unit 52 sets the leading address of the ASE [i] to the LSN of the processing target sector calculated in the process of the Step S70 and sets the length of the ASE [i] to the initial value "1" in Step S71.

When the process of Step S72 is ended, the second preparation unit 52 returns the process to Step S65 and repeats the subsequent process so that the subsequent sector is selected as the processing target.

In Step S68, When the sector just before the processing target sector is also the allocation space sector and it is judged that the processing target sector is not the allocation start sector, the second preparation unit 52 allows the process to proceed to Step S73 and increments the length of ASE [i] by "+1". When the process of Step S73 is ended, the second preparation unit 52 returns the process to Step S65 and repeats the subsequent process so that the subsequent sector is selected as the processing target.

As described above, the second preparation unit 52 repeats the processes of Steps S65 to S73 for each sector information. When all sector information of the USB is processed and it is judged that unprocessed sector information does not exist in Step S65, the second preparation unit 52 allows the process to proceed to Step S74 and stores all information of ASE [i] as the second ASE.

When the process of Step S74 is ended, the second preparation unit 52 returns the process to Step S3 of FIG. 10 and performs the process following Step S4.

An example of an actual time required for the replication process described above will hereinafter be described. Here, when a visual format recorded in BLU-RAY DISC is an HD25 (25 frames/second, HD (High Definition) image) and the AV data of 11,000 frames, that is, about 6 minutes is replicated and when the visual format recorded in BLU-RAY DISC is IMX50 (50 frames/second, IMX compression format, 16-bit resolution, and 8-channel audio) and the AV data of 16,201 frames, that is, audio of about 9 minutes is replicated, examples of times required for the data replication in two methods such as an on-the-fly method and an image data-through method are shown for each of the data replication processes.

As shown in FIG. 1, the on-the-fly method is a replication method in which the replication source recording medium 21 and the replication destination recording medium 22 are mounted in different drives (the drive 12 and the drive 13) and the information read from the replication source recording medium 21 is just written in the replication destination recording medium 22, and the image data is not prepared. On the contrary, the image data-through method is a method used at the time when the replication source recording medium 21 and the replication destination recording medium 22 are mounted in a common drive. The image data-through method is a replication method using the image data in which the replication source recording medium 21 is mounted in the drive, the image data of the information read from the replication source recording medium 21 is prepared and maintained, the replication source recording medium 21 mounted in the drive is exchanged with the replication destination recording medium 22, and the image data is written in the replication destination recording medium 22 after the image data is prepared.

Accordingly, in the following list, a total time required for reading and writing is displayed in the on-the-fly method, and a time required for reading and a time required for writing are separately displayed in the image data-through method.

In 'HD25', 11,000 frames (about 6 minutes) (the number of transmitted sectors: 764,179)

On-the-fly method: 187 seconds (3 minutes 7 seconds), 64.2 Mbps

Image data-through method (reading): 182 seconds (3 minutes 2 seconds), 65.7 Mbps Image data-through method (writing): 194 seconds (3 minutes 14 seconds), 61.8 Mbps In 'IMX50 16 bit/8ch', 16,201 frames (about 9 minutes) (the number of transmitted sectors; 1,977,874)

On-the-fly method: 490 seconds (8 minutes 10 seconds), 63.0 Mbps

Image data-through method (reading): 389 seconds (6 minutes 29 seconds), 79.6 Mbps Image data-through method (writing): 480 seconds (8 minutes 0 second), 64.4 Mbps On the contrary, in the known method of replicating the image data of the entire recording area, when the reading speed is constant at the time of, the time required for the data replication is at least twice (reading and writing) as long as a recordable time (for example, 360 minutes for an SD image and 120 minutes for an HD image in BLU-RAY DISC).

In the known method of reading the only valid data from the recording medium serving as the replication source and writing the valid data in the recording medium serving as the replication destination, since it is necessary that the reading is at least performed for the entire recording area, the reading time requires at least the recordable time. Since it is necessary to judge whether or not the valid data, change the address, and updates the data, the total time required for the data replication is further increased by adding the writing time thereto.

In the method, the replication device 1 according to the embodiment of the invention can perform the replication in shorter time as shown in the above-mentioned list.

As described above, the replication device 1 can reduce the unnecessary reading or writing of the data and to shorten the time required for the data replication in the data replication in the unit of the recording medium in which the replica of the valid information, which is recorded in the recording medium serving as the replication source in the recording medium serving as the replication destination. In particular, it is possible to shorten a time required for preparing the replica of the recording medium having a little information. At this time, it is possible to suppress the occurrence probability of defect in the real-time data area by replicating only the valid information sector and to reduce occurrence of a disabled disc caused by the defect.

The allocation space descriptors of the ASE are sorted in the order in which the leading address of the allocation space is low in consideration of the recording order in the replication device in the XDCAM format at the time of the replication and an input/output manipulation is performed, the replication device 1 can scan the disc in the order of from an inner circumference to an outer circumference of the disc at the time of the reading and the writing. As the result, it is possible to minimize the seek time.

In FIG. 1, although the replication device 1 is described which includes the drive 12 in which the replication source recording medium 21 is mounted and the drive 13 in which the replication destination recording medium 22 is mounted, and controls the replication between the drives, the replication device 1 is not limited to this. For example, a device controlling the replication process between different devices may be used as the replication device 1.

Figure 14:
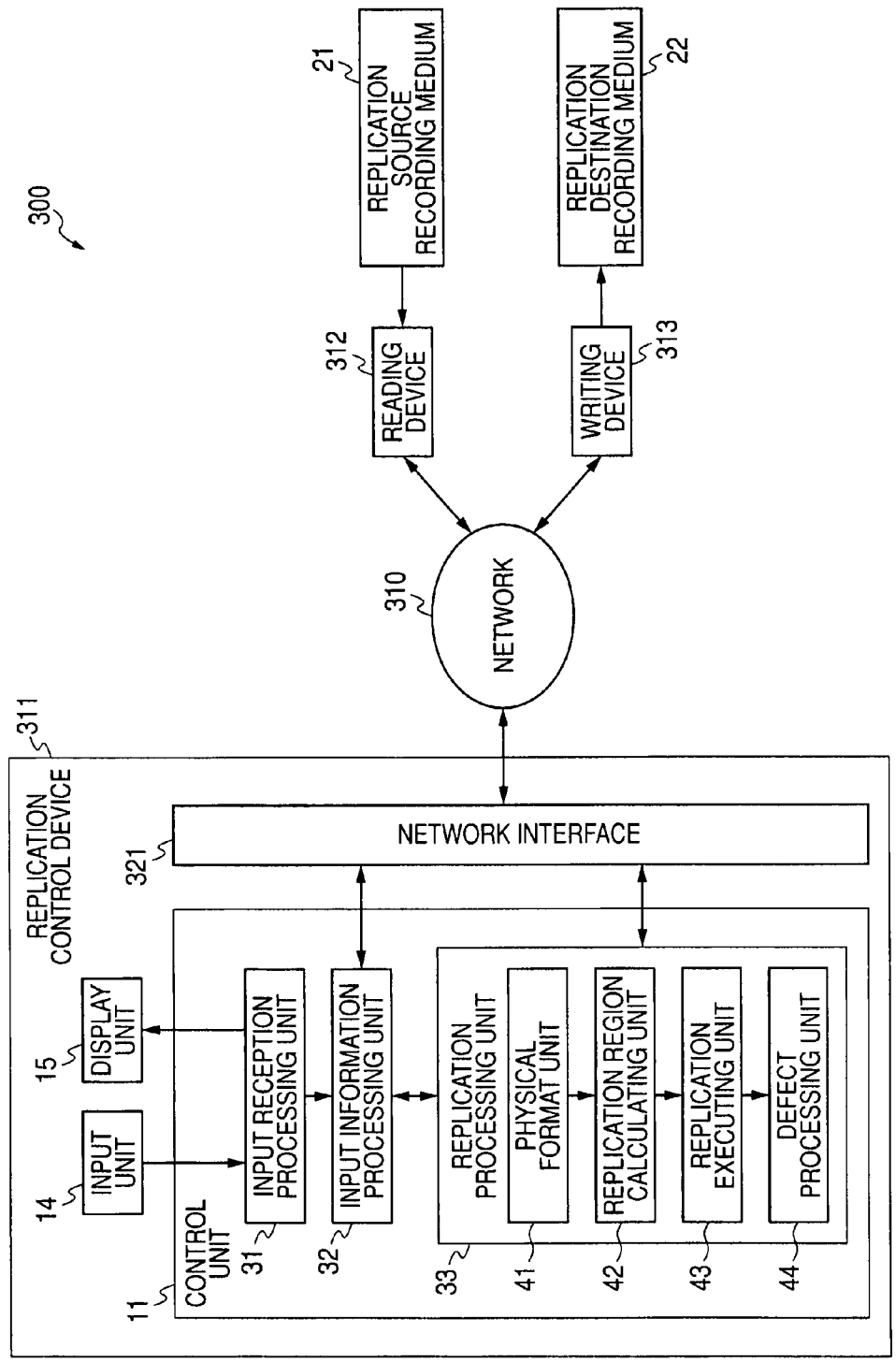
FIG. 14 is a block diagram illustrating a configuration example of a replication system according to an embodiment of the invention.

FIG. 14 is a block diagram illustrating a configuration example of a replication system according to the embodiment of the invention.

A replication system 300 is a system preparing the back-up or the copy of the data similarly to the replication device 1 of FIG. 1. The replication system 300 includes a replication control device 311, a reading device 312, and a writing device 313 connected to a network 310.

The network 310 is a predetermined network represented by Internet, WAN (Wide Area Network), or LAN (Local Area Network) and the network 310 is a transmission medium transmitting information delivered between devices connected to the network 310. The network 310 may be constituted by one network and it may be constituted by combination of a plurality of networks. The network 310 may be any kind of network, and it may be a wired network, a wireless network, or combination thereof.

The replication control device 311 is a device controlling replication of the information. The replication control device 311 controls the reading device 312 through the network, reads the information recorded in the replication source recording medium 21 mounted in a drive of the reading device 312, and controls the writing device 313 and writes the read information in the replication destination recording medium 22 mounted in a drive of the writing device 313.

The reading device 312 has a predetermined drive corresponding to the drive 12 of FIG. 1. The reading device reads information from the replication source recording medium 21 mounted in the drive and supplies the read information to the replication control device 311. The writing device 313 has a predetermined drive corresponding to the drive 13 of FIG. 1. The writing device 313 writes the information supplied from the replication control device 311 in the replication destination recording medium 22 mounted in the drive.

Although the replication control device 311 basically has the same configuration as the replication device 1 of FIG. 1, the replication control device 311 is different from the replication device 1 in that it has a network interface 321 instead of the bus 10, the drive 12, and the drive 13. The network interface 321 is a processing unit performs an interface process for the network 310 of the control unit 11. In other words, the network interface 321 supplies control information supplied from the control unit 11 to the reading device 312 or the writing device 313 via the network 310, or supplies response information supplied from the reading device 312 or the writing device 313 via the network 310 to the control unit 11.

In other words, the replication control device 311 has a function corresponding to the control unit 11, the input unit 14, and the display unit 15 shown in FIG. 1. The replication control device 311 can control the replication of the information performed between the different devices. Accordingly, the replication system constituted by the plurality of devices can also reduce the unnecessary reading or writing of the data irrespective the amount of the data, shorten the time required for the data replication, suppress the occurrence probability of the defect, and reduce the seek time at the time of writing the data in the data replication in the replication process similarly to the replication device 1 of FIG. 1.

The replication system 300 may has a configuration other than the configuration of FIG. 14. For example, the replication control device 311 may be constituted by the plurality of devices. For example, the replication region calculating unit 42 may be configured separately from the replication control device 311 and the replication region calculating unit 42 may supply the prepared ASE to the replication control device 311 at the time of replication.

As described above, the first preparation unit 51 prepares the first ASE on the basis of the USD with respect to the allocation space of a part other than the partition area of the volume area. However, for example, when the usable file format of the replication source recording medium 21 or the replication destination recording medium 22, and the kind and the capacity of the medium are limited and the replication device 1 selects an only specific recording medium as the replication processing target, that is, when the leading address or the length of the allocation space of the part other than the partition area of the volume area is fixed, it is possible to prepare the first ASE in advance (it is not necessary to prepare the first ASE usually with reference to the USD). However, since the allocation space in the partition area is different for each recording medium, it is necessary that the second preparation unit 52 prepares the second ASE usually with reference to the USB as long as repeated replication is not performed from the same replication source recording medium 21.

When the entire partition area is selected as the allocated space, the second preparation unit 52 of the replication region calculating unit 42 may be also omitted. However, in this case, the unnecessary reading or writing may occur in replication of the partition area.

BLU-RAY DISC is used as the replication source recording medium 21 and the replication destination recording medium 22 as described above, but an optical disc other than BLU-RAY DISC may be used as the replication source recording medium 21 and the replication destination recording medium 22. Recording media other than the optical disc, for example, a magnetic recording medium such as a flexible disc, a hard disc, or a magnetic tape, a magneto-optical disc such as MD (Mini-disc) (Registered Trademark of Sony Corporation), and a semiconductor memory such as a flash memory may be used. In other words, any readable recording medium may be used as the replication source recording medium 21 and any writable recording medium may be used as the replication destination recording medium 22. However, the drive 12 or the drive 13 is applied for each recording medium. For example, when the hard disc is used as the recording medium, the drive 12 or the drive 13 becomes unnecessary. Accordingly, the drive 12 or the drive 13 may be omitted.

The configuration example of the volume area is shown in FIG. 3, but this configuration may be any configuration and it may be a configuration other than that of FIG. 3. For example, a plurality of partition areas may be provided in the volume area. In this case, the second preparation unit 52 prepares the second ASE for each of the partition areas and the sort unit 53 prepares the incorporation ASE by incorporating the first ASE and the second ASE. Then, the allocation space descriptors are sorted by the leading address of the allocation space.

A plurality of volume areas may be formed in one recording medium. In this case, the replication region calculating unit 42 prepares the ASE for each of the volume areas and the replication executing unit 43 performs the replication process by using the ASE corresponding to each of the volume areas.

As described above, the UDF (the XDCAM file format based on a UDE) is used as the file format of the replication source recording medium 21 and the replication destination recording medium 22, but any file format may be used as the file format.

In FIG. 1, the replication source recording medium 21 and the replication destination recording medium 22 are mounted in the different drives, but the replication source recording medium 21 and the replication destination recording medium 22 may be mounted in the common drive. In other words, the present invention may be applied to the replication in the above-mentioned image file mode.

The configuration example of the ASE is shown in FIG. 4, but as long as the ASE is the information which can specify the allocation space part from the recording area, the configuration of the ASE may be any configuration and it may further have allocation space information other than the above-mentioned information.

The above-mentioned processing units may be constituted by a plurality of information processing devices as long as the processing units can implement the same function. For example, the process of the replication processing unit 33 shown in FIG. 1 may be executed by the plurality of information processing devices by means of a distributed computing technology.

The allocation space information is written in the same address of the replication destination recording medium 22 as that of the replication source recording medium 21 as described above, but the writing of the allocation space information is not limited to this and the allocation space information may be written in the address of the replication destination recording medium 22 different from that of the replication source recording medium 21. However, in this case, it may be necessary to update the information in consideration of a reference relationship between the information.

It is preferable that the recording capacity of the replication source recording medium 21 is the same as (alternatively, less than that of the replication destination recording medium) the replication destination recording medium 22. However, although the recording capacity of the replication destination recording medium 22 is less than that of the replication source recording medium 21, it may be possible to perform the replication.

The information of one replication source recording medium 21 is written in one replication destination recording medium 22 as described above, the number of the replication source recording media 21 and the number of the replication destination recording media 22 are arbitrary. For example, the replication device 1 may record a replica of the information of one replication source recording medium 21 in the plurality of replication destination recording media 22 and it may record collected replicas of the information of the plurality of replication source recording media 21 in one replication destination recording medium 22. The replicas of the information of the plurality of replication source recording media 21 may be written in different replication destination recording media 22. After the replicas of the information of the plurality of replication source recording media 21 are once collected and the collected information is partitioned into the number of the replication destination recording media 22, the partitioned data may be recorded in different replication destination recording media 22.

However, when an address in reading is different from an address in writing, it is necessary that the replication device 1 performs a process such as recalculation of the addresses or reconstruction of the data.

The series of processes described above may be executed by hardware or by software. In this case, a device which executes the software may be constituted by a personal computer shown in FIG. 15, for example.

A CPU (Central Processing Unit) 401 of a personal computer 400 executes various processes in accordance with a program stored in a ROM (Read Only Memory) 402 or a program loaded from a storage unit 413 into a RAM (Random Access Memory) 403 as shown in FIG. 15. The RAM 403 also stores data and the like necessary for the CPU 401 to execute the various processes as needed.

The CPU 401, the ROM 402, and the RAM 403 are interconnected via a bus 404. The bus 404 is also connected with an input/output interface 410.

The input/output interface 410 is connected with an input unit 411 constituted by a keyboard, a mouse, and the like, an output unit 412 constituted by a display such as a CRT or an LCD, a speaker and the like, the storage unit 413 constituted by the hard disc and the like, and a communication unit 414 constituted by a modem and the like. The communication unit 414 performs a communication process via the network including Internet.

The input/output interface 410 is also connected with a drive 415 as needed. A removable medium 421 constituted by a magnetic disc, the optical disc, the magneto-optical disc, or the semiconductor memory is suitably mounted in the drive 415 and a computer program read from the removable medium 421 is installed in the storage unit 413 as needed.

When the series of processes described above are executed by the software, a program constituting the software is installed from the network or the recording medium.

As shown in FIG. 15, the recording medium is constituted by the removable medium 421 distributed to the user to provide the program separately from a device body and having the program recorded therein, the removable medium 421 being constituted by the magnetic disc (including the flexible disc), the optical disc (including the CD-ROM and the DVD), and the magneto-optical disc (including MD), or the semiconductor memory. The recording medium is also constituted by the ROM 402 or the hard disc included in the storage unit 413 which has the program recorded therein and which is provided to the user in a state of being preincorporated in the device body.

In the present specification, the steps describing the program recorded in the recording medium include processes performed in time series in the described order in addition to processes performed in parallel or individually and not necessarily in time series.

In the present specification, a system represents a device as a whole constituted by a plurality of devices.

As described above, the configuration described by the one device may be partitioned and the plurality of devices may be configured. On the contrary, the configuration descried by the plurality of devices described above is collected and the one device may be configured. A configuration other than the configuration described above may be also added to the configurations of the apparatus and the plurality of devices. In addition, when the whole system configurations and operations of the apparatus and the plurality of devices are substantially the same as each other, a part of the configuration of any one device may be included in the configuration of the other device.

The embodiments are not limited to the preferred embodiments, but various modifications may occur insofar as they are thin the scope of the appended claims or the equivalents thereof.

The present invention can be applied to an information replication device.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device performing replication of data between recording media so that valid information recorded in a first recording medium is recorded in a second recording medium, the information processing device comprising:
    a replication control unit controlling the replication of the data so that only information of an allocation space which is an area having the valid information recorded therein is read from the first recording medium serving as a replication source and the read valid information is written in the second recording medium serving as a replication destination, the replication control unit comprising:
    a replication region specifying unit to specify a plurality of allocation space descriptors of the first recording medium, each allocation space descriptor including a respective leading address and length of an allocation space, the allocation space representing an area that only has valid data to be replicated on the second recording medium, wherein the replication region specifying unit is enabled to sort the plurality of allocation space descriptors in order of the leading address.

2. The information processing device according to claim 1, wherein the replication control unit controls the replication of the data so that the only information of the allocation space specified by the replication region specifying unit is read and the read information is written in the second recording medium serving as a replication destination.

3. The information processing device according to claim 2, wherein the replication region specifying unit has a first preparation unit to prepare first allocation information for an entire logical volume specifying the allocation space on the basis of first management data for managing information on an unallocation space in a unit of a logical volume of the recording area of the first recording medium serving as an area in which the valid information is not recorded.

4. The information processing device according to claim 3, wherein the first management data manages a leading address and a length of the unallocation space, and the first preparation unit prepares the first allocation information for specifying a leading address and a length of the allocation space managed by the first management data on the basis of the leading address and the length of the unallocation space.

5. The information processing device according to claim 3, wherein the first preparation unit deletes information specifying an allocation space including an area in which predetermined valid information is stored from the first allocation information.

6. The information processing device according to claim 3, wherein the replication region specifying unit further includes a second preparation unit to prepare second allocation information for a partition area in the logical volume specifying the allocation space on the basis of second management data for managing the information on the unallocation space of the partition area in which the predetermined valid information is stored in the replication source recording medium.

7. The information processing device according to claim 6, wherein the second management data has a bit string managing whether or not the valid information is recorded in sectors of the partition area in which the predetermined valid information is stored by values of bits and the second preparation unit prepares the second allocation information for specifying the leading address and the length of the allocation space in the partition area in which the predetermined valid information is stored on the basis of the values of the bits of the bit string.

8. The information processing device according to claim 7, wherein the second preparation unit prepares the second allocation information by converting the leading address of the allocation space in the partition area in which the predetermined valid information is stored into an address in the entire recording area of the first recording medium.

9. The information processing device according to claim 6, wherein the replication region specifying unit further includes a sort unit incorporating the first allocation information prepared by the first preparation unit and the second allocation information prepared by the second preparation unit, and sorting the information of the allocation space in the ascending order of the leading address of the allocation space so as to prepare third allocation information.

10. The information processing device according to claim 1, further comprising:

a defect processing unit performing a predetermined process for a defect occurring in a recording area of the second recording medium.

11. The information processing device according to claim 10, wherein the defect processing unit abnormally ends a replication process for occurrence of the defect as the predetermined process.

12. The information processing device according to claim 10, wherein the defect processing unit avoids an area in which the defect occurs for the occurrence of the defect and performs writing in a reserve area as the predetermined process.

13. The information processing device according to claim 1, further comprising:

a reading unit reading the only information of the allocation space from the first recording medium on the basis of control of the replication control unit; and a writing unit writing the information of the allocation space read by the reading unit in the second recording medium on the basis of the control of the replication control unit.

14. The information processing device according to claim 1, further comprising:

a display control unit allows a user to display a GUI screen for inputting a user's instruction relating to the data replication on a display screen; and an input reception unit receiving the user's instruction input by the user on the basis of the GUI screen.

15. The information processing device according to claim 1, further comprising:

a communication unit communicating with a reading device reading the only information of the allocation space from the first recording medium and a writing device writing the information of the allocation space in the second recording medium, and supplying control information for the data replication generated by the replication control unit to the reading device and the writing device.

16. An information processing device, comprising:

a replication unit to replicate valid information to a second recording medium serving as a replication destination from a first recording medium serving as a replication source; and a replication control unit controlling the replication unit to read information of an allocation space serving as an area in which the valid information is recorded from the first recording medium and write the read information in the second recording medium, the replication control unit comprising:

a replication region specifying unit to specify a plurality of allocation space descriptors of the first recording medium, each allocation space descriptor including a respective leading address and length of an allocation space, the allocation space representing an area that only has valid data to be replicated on the second recording medium, wherein the replication region specifying unit is enabled to sort the plurality of allocation space descriptors in order of the leading address.

17. A non-transitory computer readable medium storing a program for making a computer perform data replication between recording media so that valid information recorded in a first recording medium is recorded in a second recording medium, the program comprising the steps of:

specifying a plurality of allocation space descriptors of the first recording medium, each allocation space descriptor including a respective leading address and length of an allocation space, the allocation space representing the area that only has valid data to be replicated on the second recording medium, sorting the plurality of allocation space descriptors in order of the leading address;

reading only information of an allocation space according to the allocation space descriptors serving as an area in which the valid information is recorded from the first recording medium serving as a replication source; and writing the information read from the first recording medium in the second recording medium serving as a replication destination.

18. A method of performing data replication between recording media so that valid information recorded in a first recording medium is recorded in a second recording medium, the method comprising the steps of:

specifying a plurality of allocation space descriptors of the first recording medium, each allocation space descriptor including a respective leading address and length of an allocation space, the allocation space representing the area that only has valid data to be replicated on the second recording medium, sorting the plurality of allocation space descriptors in order of the leading address;

reading only information of an allocation space according to the allocation space descriptors serving as an area in which the valid information is recorded from the first recording medium serving as a replication source; and writing the information read from the first recording medium in the second recording medium serving as a replication destination.

19. An information processing method, comprising the steps of:

specifying a plurality of allocation space descriptors of the first recording medium, each allocation space descriptor including a respective leading address and length of an allocation space, the allocation space representing the area that only has valid data to be replicated on the second recording medium, sorting the plurality of allocation space descriptors in order of the leading address;

replicating valid information to a second recording medium serving as a replication destination from a first recording medium serving as a replication source; and reading information of an allocation space according to the allocation space descriptors serving as an area in which the valid information is recorded from the first recording medium and writing the read information in the second recording medium.

* * * * *